United States Patent [19]

Murata et al.

[11] Patent Number: 5,713,442
[45] Date of Patent: Feb. 3, 1998

[54] FLUID TRANSMISSION DEVICE

[75] Inventors: Kiyohito Murata; Hiroyuki Shioiri, both of Susono, Japan

[73] Assignee: Toyota Jidosha Kabushiki Kaisha, Toyota, Japan

[21] Appl. No.: 617,944

[22] Filed: Mar. 15, 1996

[30] Foreign Application Priority Data

| Mar. 17, 1995 | [JP] | Japan | 7-058980 |
| Jun. 9, 1995 | [JP] | Japan | 7-143177 |
| Oct. 27, 1995 | [JP] | Japan | 7-280211 |
| Jan. 26, 1996 | [JP] | Japan | 8-011851 |

[51] Int. Cl.$^6$ .................................................. F16H 45/02
[52] U.S. Cl. ..................... 192/3.29; 192/30 V; 192/213.2
[58] Field of Search ............................ 192/3.28, 3.29, 192/3.3, 30 V, 212, 213.1, 213.2

[56] References Cited

U.S. PATENT DOCUMENTS

| 4,002,228 | 1/1977 | Borman | 192/3.3 |
| 4,693,348 | 9/1987 | Tsukamoto et al. . | |
| 4,844,216 | 7/1989 | Fukushima | 192/3.29 X |
| 5,062,517 | 11/1991 | Muchmore et al. | 192/3.29 X |
| 5,065,385 | 11/1991 | Fujimoto et al. | 192/3.29 |
| 5,086,892 | 2/1992 | Schierling | 192/3.29 |
| 5,195,621 | 3/1993 | Dull et al. | 192/3.29 |
| 5,203,835 | 4/1993 | Kohno et al. | 192/3.29 |
| 5,348,127 | 9/1994 | Murata et al. . | |
| 5,388,678 | 2/1995 | Murata | 192/3.29 |

FOREIGN PATENT DOCUMENTS

| 0 473 181 | 3/1992 | European Pat. Off. . |
| 0 533 426 | 3/1993 | European Pat. Off. . |
| 2 526 907 | 11/1983 | France . |
| 2 618 199 | 1/1989 | France . |
| 61-252958 | 11/1986 | Japan . |
| 63-251661 | 10/1988 | Japan . |
| 63-251662 | 10/1988 | Japan . |
| 63-251664 | 10/1988 | Japan . |
| 5-45306 | 6/1993 | Japan . |

*Primary Examiner*—Richard M. Lorence
*Attorney, Agent, or Firm*—Oblon, Spivak, McClelland, Maier & Neustadt, P.C.

[57] ABSTRACT

In a fluid transmission device which includes a pump, a turbine (6 in FIG. 2), and a direct coupling clutch (10) having a damper function; the turbine (6) being a member which is located downstream of the damper function and which does not contribute to torque transmission under the operating state of the direct coupling clutch (10) is resiliently supported by an inner damper spring (46) being an elastic body, so that the turbine (6) is utilized as a damper weight which affects the dynamic balance of the damper function. Thus, the direct-connectible region of the direct coupling clutch of the fluid transmission device is expanded toward the lower vehicle speed range of a motor vehicle so as to enhance the fuel consumption of the motor vehicle, without worsening the oscillation characteristics of the device.

18 Claims, 30 Drawing Sheets

FLUID TRANSMISSION DEVICE

BACKGROUND OF THE INVENTION

1. Field of the Invention

The present invention relates to a fluid transmission device (or a fluid torque converter). More particularly, it relates to a fluid transmission device which includes a direct coupling clutch (or a lockup clutch) having a damper function or damper mechanism.

2. Description of the Prior Art

Heretofore, as disclosed in the official gazette of Japanese Patent Application Laid-open No. 252958/1986 by way of example, a fluid transmission device including a direct coupling clutch usually has a damper mechanism (function) made up of a spring etc., in order to suppress the fluctuation of a torque from an engine at the time of the actuation or engagement of the direct coupling clutch (at the time of lockup-ON).

On this occasion, in order to expand the direct-connection drivable region of a motor vehicle (i.e., the direct-connectible region of the direct coupling clutch) toward the lower vehicle speed range thereof (for enhancing fuel consumption), the torsional rigidity of the damper mechanism may be set low.

This will be explained by the use of the simplified model of an oscillation transmission system shown in FIG. 40 of the accompanying drawings.

Referring to the figure, symbol I1 denotes the moment of inertia of a portion which consists of the engine and the primary side of the automatic transmission of the fluid transmission device (the primary side being the upstream of the automatic transmission with respect to the damper mechanism and extending from the input side of the automatic transmission to the damper mechanism of the direct coupling clutch), while symbol I2 denotes the moment of inertia of a portion which consists of the secondary side of the automatic transmission (the secondary side being downstream with respect to the damper mechanism). In addition, letter B denotes the body of the motor vehicle. Besides, symbol K1 denotes the torsional rigidity of the damper mechanism of the direct coupling clutch, and K2 denotes that of a drive shaft connected to the secondary side of the automatic transmission. A damping term F1 is based on friction, and damping terms V1 and V2 are based on velocities.

By way of example, in the case of the direct-connection drive of the motor vehicle whose engine is a four-cylinder one, the first-order mode resonance point at which the moments of inertia I1 and I2 oscillate in inphase fashion is existent near 300 [rpm], and the second-order mode resonance point at which the moments of inertia I1 and I2 oscillate in antiphase fashion is existent near 1000 [rpm]. Of the two resonance points, the first-order mode one is not problematic because the revolving speed lies outside the available revolution region of the engine. It is the second-order mode resonance point that is problematic during the actual direct-connection drive.

It is accordingly understood that, in order to expand the direct-connectible region of the direct coupling clutch toward the lower vehicle speed range of the motor vehicle, the engine speed of the second-order mode resonance point should be set at the lowest possible revolution speed. Methods which have heretofore been proposed for lowering the revolution speed of the second-order mode resonance point, include one wherein the torsional rigidities K1 and K2 are lowered, and one wherein the apportionment of the moments of inertia I1 and I2 is optimized.

In the prior-art technique stated in the official gazette of Japanese Patent Application Laid-open No. 252958/1986 mentioned before, the torsional rigidity K1 is reduced by employing a coiled compression spring of small spring constant and great stroke length.

With either of the prior-art methods, however, a physical restriction is involved, and the expansion of the direct-connectible region toward the lower vehicle speed range is limited. More specifically, the reduction of the torsional rigidity K1 of the damper mechanism is limited due to spatial limitation. On the other hand, in fact, it is impossible to drastically reduce the torsional rigidity K2 of the drive shaft.

Moreover, regarding the apportionment of the moments of inertia I1 and I2, it is structurally almost impossible to set them at will, and a compromise must be made with predetermined values.

For example, when the moment of inertia I1 is caused to decrease, the oscillations of the engine and the primary side of the automatic transmission increase to incur the problems of the durabilities of auxiliaries and the so-called "squeaking" of auxiliaries driving belts. Besides, in a case where a weight member is added to the secondary side of the automatic transmission with the intention of increasing the moment of inertia I2, as disclosed in the official gazette of Japanese Patent Application Laid-open No. 251661/1988 by way of example, the fluid transmission device itself becomes heavier in weight and larger in size.

SUMMARY OF THE INVENTION

The present invention has been made in order to solve the problems of the prior art explained above, and has for its object to provide a fluid transmission device in which oscillations at the time of lockup-ON are sufficiently reduced without increasing the weight of the device or a space for accommodating the device, whereby the direct-connectible region of a direct coupling clutch can be expanded toward the lower vehicle speed range of a motor vehicle so as to enhance the fuel consumption of the motor vehicle and to enhance the durabilities of auxiliaries.

The present invention has achieved the above object by adopting a structure which includes a direct coupling clutch having a damper function, a mass member which originally constitutes the fluid transmission device and which does not contribute to torque transmission under an operating state of the direct coupling clutch is utilized as a damper weight which affects a dynamic balance of the damper function during operation of the direct coupling clutch, to achieve the above object.

In this application, two types of representative preferred embodiments are respectively disclosed.

The principle of one of the embodiments of the present invention will be elucidated using a simplified model.

FIG. 1A illustrates the simplified model of an oscillation transmission system according to the present invention. The oscillation transmission system is such that a dynamic damper d is added to the prior-art system shown in FIG. 40. In FIG. 1A, symbols I0 and K0 denote the moment of inertia of the dynamic damper d and the torsional rigidity of this damper, respectively. The moment of inertia I0 may be either that part of the moment of inertia I2 which is separated therefor, or a factor which is originally irrelevant to the moment of inertia I2. Anyway, the moment of inertia I0 is afforded by a member which originally constitutes the fluid transmission device and which does not contribute to the torque transmission at the time of lockup-ON. Alternatively, it may be afforded by part of said member.

Referring to FIG. 1A, now the respective damping terms F1 and V1 based on the friction and the velocity in the simplified model in the prior art are assumed to be neglected. On this occasion, if the torsional rigidity K0 and the moment of inertia I0 of the dynamic damper d appropriately designed are exerted on the moment of inertia I2 of the secondary side of the automatic transmission, then, the fluctuating level of the moment of inertia I2 of the secondary side of the automatic transmission can be rendered 0 (zero) at an oscillation frequency $p0=\sqrt{K^0/I^0}$.

Strictly speaking, on this occasion, new resonance points appear on both a side of oscillation frequencies higher than the oscillation frequency p0 and a side of oscillation frequencies lower than the same. Accordingly, the oscillating level of the moment of inertia I2 rather heightens at the oscillation frequencies of the new resonance points. However, when the moment of inertia I0 and the torsional rigidity K0 of the dynamic damper d to be added are appropriately designed, the oscillating level in the region of the resonance point whose oscillation frequency is higher than the oscillation frequency p0 can be lowered to a level which poses no problem even in the case of the direct connection of the direct coupling clutch (owing also to the fact that the fluctuating level of the engine torque as a driving source being lowers in this region). Besides, regarding the region of the resonance point whose oscillation frequency is lower than the oscillation frequency p0, no particular problem is posed by designing the direct coupling clutch so as not to execute the direct connection in this region.

Incidentally, according to a feature of the present invention, the above higher side problem is reduced more actively.

With note taken of such a principle, the present invention consists in that the moment of inertia I0 and the torsional rigidity K0 of the dynamic damper d to be added are properly designed, whereby the direct-connection drive of the motor vehicle is permitted even in the region in which it is impossible with the prior-art structure (the region near the second-order mode resonance point).

More specifically, the member (for example, a turbine body), which originally constitutes the fluid transmission device and which does not contribute to the torque transmission under the operating state of the direct coupling clutch (or under the lockup-ON state of the lockup clutch), is resiliently supported on a member (for example, a turbine hub) contributive to the torque transmission, through an elastic body. As a result, when the direct coupling clutch is in the operating state, the member which does not contribute to the torque transmission can be caused to function as the dynamic damper d. Concretely, the part of the existing fluid transmission device is employed as the mass body of the dynamic damper d, namely, as the mass member for generating the moment of inertia I0, while the torsional rigidity K0 of the dynamic damper d is adjusted by the elastic body.

Since the dynamic damper d is formed of the originally existing member in this manner, the dynamic damper function can be added without especially incurring new increases in the weight and the accommodation space thereof. Thus, the direct-connection drivable region of the motor vehicle can be expanded toward the lower vehicle speed range thereof on the basis of the principle elucidated above, so that the fuel consumption can be enhanced.

On the other hand, according to another feature of the invention the dynamical balance of the damper function is altered between in the lockup-ON state and lockup-OFF state of a fluid transmission device by utilizing an originally existing member in the fluid transmission device.

As illustrated in FIG. 1B, in another embodiment, at the time of lockup-ON, the member which has heretofore been irrelevant to the moment of inertia I2 of the secondary side (the member which has not been rotary, for example, a stator) is united with a member forming the moment of inertia I2, thereby to increase the moment of inertia I2 of the secondary side to (I2+Ia). The member which forms the moment of inertia Ia, is the member which originally constitutes the fluid transmission device and which has hitherto been irrelevant to the moment of inertia I2 of the secondary side under the lockup-ON state. Owing to the union, therefore, the secondary-side moment I2 can be increased without employing any additional weight member or piece for exclusive use.

Besides, at the time of lockup-OFF, the secondary-side moment returns to its original value I2 (from I2+Ia), so that the starting responsiveness etc. of the motor vehicle are not spoilt.

Hereinafter, preferable aspects of performance (preferable embodiments) of present invention are as follows.

A preferable aspect of performance of the present invention is to comprise a stopper mechanism for preventing the elastic body from flexing in excess of a predetermined magnitude when the direct coupling clutch is in a non-operating state.

Thus, the elastic body can be prevented from undergoing any excessive torque, and the durability thereof can be enhanced.

By way of example, in the case where the turbine is resiliently supported by a spring body, a torque which the turbine receives from a pump is output through the spring body under the non-operating state of the direct coupling clutch, and hence, a heavy load acts on the spring body. Therefore, when the stopper mechanism is disposed to prevent the spring body from flexing in excess of a predetermined magnitude, the spring body is prevented from undergoing any excessive torque and from transmitting the torque in close wire contact (in the state in which the spring is completely compressed to lose its elastic force). Accordingly, the durability of the spring body is enhanced.

In another preferable aspect of performance, the member which is resiliently supported by the elastic body includes a lug, and the stopper mechanism is constructed by utilizing the lug.

Thus, the stopper mechanism can be constructed by the minor improvement of the existing component, to enhance the productivity of the stopper mechanism and to minimize the occupation space thereof.

A still different preferable aspect of performance is to comprise a restraint means for restraining the function of the elastic body when the direct coupling clutch is in the non-operating state.

In the case where the function of the elastic body is regulated in this manner (especially, so as to be quite null), the durability of the elastic body can be enhanced more than in the case of merely disposing the stopper mechanism.

A still different preferable aspect of performance consists in that the elastic body is retained in a previously-biased state. Thus, the elastic body is not used in the vicinity of the initial flexure or perfect wire contact thereof, so that the required characteristics of the elastic body can be stably realized.

A still different preferable aspect of performance consists in that the elastic body is arranged extending in the direction of a tangential line at the point of contact between the elastic body and the member which constitutes the fluid transmission device and which does not contribute to the torque transmission under the operating state of the direct coupling clutch, the tangential line being tangential to a circle which passes through the point of contact and which is concentric with the axial line. Thus, the component of a force which presses the elastic body in the radial direction of the circle under the compression of this elastic body can be diminished to mitigate a frictional force which arises between the elastic body and a cover for retaining this elastic body. Accordingly, the durability of the elastic body is enhanced, and the characteristics thereof are also stabilized.

A still different preferable aspect of performance consists in that an interconnection portion for associating the elastic body with the member which constitutes the fluid transmission device and which does not contribute to the torque transmission under the operating state of the direct coupling clutch is formed penetrating through a retaining cover for retaining the elastic body. Thus, the interconnection portion is prevented from abutting on only part of the end surface of the elastic body, so that the characteristics of the elastic body can be stabilized.

A still different preferable aspect of performance consists in that the retaining cover for the elastic body is constructed so as to sandwich the elastic body between two plates, and each of the plates includes a cylindrical portion for accommodating the elastic body therein, as well as a general shape portion other than the cylindrical portion, the general shape portion being in a stepped shape so as to form a space when the plates are joined to each other. Thus, the cylindrical portion can be easily formed, and the performance of the retaining cover for retaining the elastic body is enhanced. Moreover, the performance of the retaining cover for supporting the elastic body is stabilized, so that the characteristics of the elastic body can be stabilized.

A still different preferable aspect of performance is to comprise an oscillation suppression means capable of suppressing oscillations which are generated anew in a specified frequency region by the resilient support based on the elastic body, under the operating state of the direct coupling clutch. Thus, it is possible to eliminate the above drawback.

A still different preferable aspect of performance consists in that the oscillation suppression means is friction damping means. Thus, the new oscillations can be suppressed by the simple construction.

A still different preferable aspect of performance consists in that the oscillation suppression means is viscous damping means. Thus, the oscillating levels which are generated anew can be lowered, and the oscillation characteristics of the fluid transmission device proper satisfy prescribed values over a wide range.

A still different preferable aspect of performance consists in that the oscillation suppression means is elastic-force variation means capable of varying the elastic force of the elastic body. Thus, the elastic body can serve also as the oscillation suppression means, so that the new oscillations can be suppressed without incurring enlargement in the size of the fluid transmission device.

A still different preferable aspect of performance consists in that the elastic body is a leaf spring, and that the elastic-force variation means is made of an inertial member which is mounted on one end side of the leaf spring in a manner to be shiftable relatively to the other end side of the leaf spring through the utilization of a centrifugal force, so as to vary the effective length of the leaf spring. Thus, the whole device can be fabricated into a compact construction with the new oscillations suppressed.

Meanwhile, preferable aspects of performance of a feature of the present invention are as follows.

A preferable aspect of performance of the present invention consists in that, in a case where the fluid transmission device is a torque converter including a stator, the stator is selected as the member which is not originally rotary under the operating state of the direct coupling clutch, and the turbine is selected as the rotary member located downstream (the secondary side) of the damper function. Thus, in the lockup-OFF state of the torque converter, the stator amplifies the torque of the primary side by its original function. Besides, in the lockup-ON state, the stator is connected with the member of the secondary side so as to contribute to the increase of the secondary-side moment of inertia I2.

A still different preferable aspect of performance consists in that the stator is automatically moved toward the turbine till the connection therewith by a fluid force which develops under the lockup-ON state. Thus, the stator can be connected with the turbine without disposing any separate means for driving the stator.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

The practicable aspects of performance (embodiments) of the present invention will now be described in detail with reference to the accompanying drawings. In the ensuing description, the first thru fifteenth aspects of performance will be pertinent to a first aspect of performance.

Figure 2:
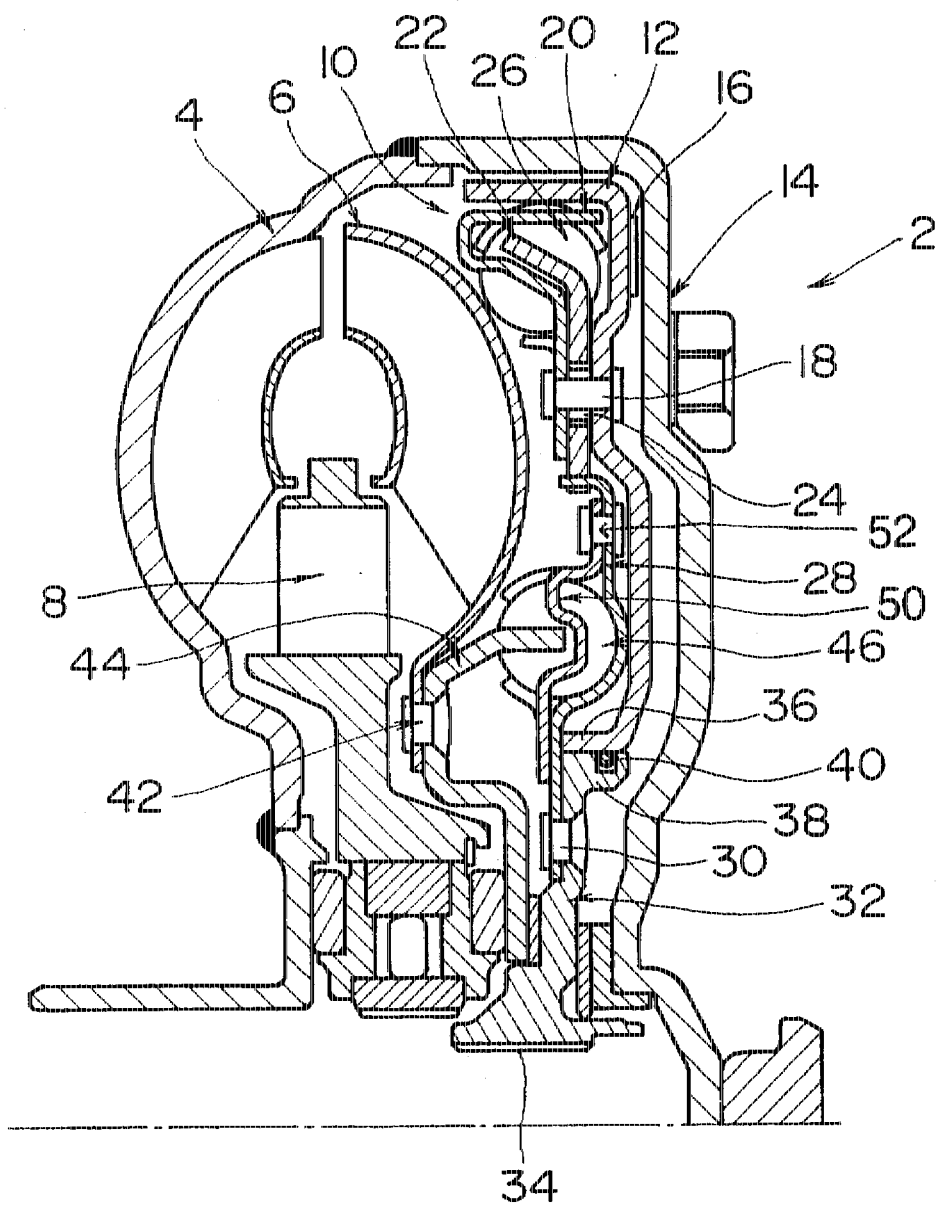
FIG. 2 is a vertical sectional view schematically showing the fluid transmission device according to the first aspect of performance of the present invention.

FIG. 2 is a vertical sectional view schematically showing a fluid transmission device according to the first aspect of performance of the present invention.

Referring to FIG. 2, a torque converter (the fluid transmission device) 2 is chiefly constructed of a pump 4, a turbine 6, a stator 8 and a direct coupling clutch (lockup clutch) 10.

The lockup piston 12 of the direct coupling clutch 10 has a lining (friction disc) 16 which abuts on the inside surface of the front cover 14 of the torque converter 2. A drive plate 20 is integrally attached to the lockup piston 12 by a rivet 18. In addition, an intermediate plate 22 is interposed between the lockup piston 12 and the drive plate 20. The intermediate plate 22 is formed with a slot 24, in which the rivet 18 is movable.

The drive plate 20 transmits a torque to a driven plate 28 through an outer damper spring 26 as well as the intermediate plate 22. The driven plate 28 is fixed to a turbine hub 32 by a rivet 30. The inner part of the turbine hub 32 is formed with a spline 34, from which the torque is transmitted to the unshown output shaft of the torque converter 2 (the input shaft of a transmission).

A flange portion 36 is formed at the inner part of the lockup piston 12. The flange portion 36 is slidably mounted on the bearing portion 38 of the turbine hub 32, and is hermetically sealed by a seal 40.

A transmission member 44 is integrally mounted on the inner part of the turbine 6 by a rivet 42. The transmission member 44 is joined to the driven plate 28 through an inner damper spring 46.

By the way, numeral 50 designates a cover for retaining the inner damper spring 46, and numeral 52 a rivet for integrating the retaining cover 50 and the driven plate 28.

The first aspect of performance operates as described below.

First, there will be explained the operation in the operating state of the direct coupling clutch 10 (in the direct-connection drive state of a motor vehicle, that is, in the non-operating state of the torque converter 2).

In the operating state of the direct coupling clutch 10, the lockup piston 12 is moved rightwards as viewed in FIG. 2 and pressed against the side of the front cover 14 under the action of a hydraulic pressure (by a known construction). The front cover 14 is driven by an engine, not shown.

Accordingly, the torque delivered from the engine is directly transmitted to the lockup piston 12 through the lining 16.

The drive plate 20 integral with the lockup piston 12 pushes one end of the outer damper spring 26. In consequence, the other end of the outer damper spring 26 pushes the intermediate plate 22. The torque transmitted to the intermediate plate 22 is transmitted through the driven plate 28 to the turbine hub 32 which is an output member.

Figure 1A:
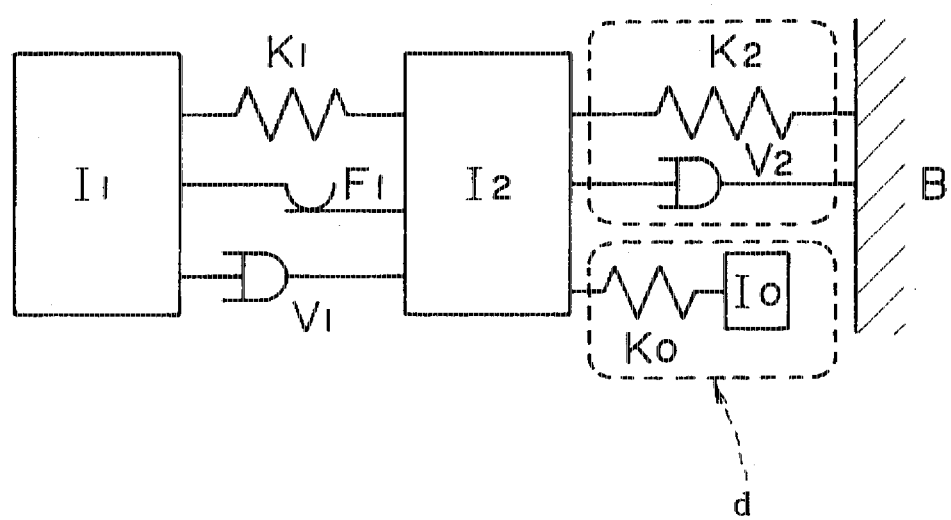
FIGS. 1A and 1B are schematic diagrams of simplified models each of which illustrates the principle of the present invention.
Figure 1B:
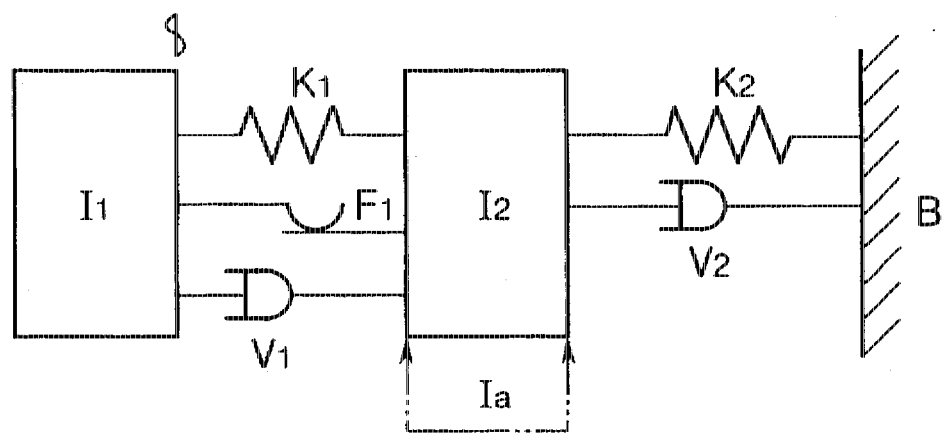

Here, the upstream side of the torque converter 2 with respect to the outer damper spring 26 (the constituents which rotate unitarily with the pump 4) corresponds to the moment of inertia I1 of the primary side of the automatic transmission in the illustration of FIG. 1, while the outer damper spring 26 corresponds to the torsional rigidity K1. Besides, the constituents of the intermediate plate 22, et seq. correspond to the moment of inertia I2 of the secondary side of the automatic transmission (the lower stream side with respect to the damper mechanism) in the illustration of FIG. 1.

The turbine 6 is arranged so as to be rotatable relatively to the turbine hub 32 on the secondary side of the automatic transmission through the inner damper spring 46 as well as the transmission member 44 fixed to the turbine 6. That is, in this aspect of performance, the turbine 6 being the member, which lies on the secondary side of the automatic transmission (downstream of the damper mechanism) and which does not contribute to the torque transmission under the operating state of the direct coupling clutch 10, is resiliently supported on the turbine hub 32 being the member which contributes to the torque transmission, through the inner damper spring 46 being an elastic body. As a result, the turbine 6 functions as the member which generates the moment of inertia I0 of the dynamic damper d in FIG. 1, while the inner damper spring 46 functions as the member which corresponds to the torsional rigidity K0 of the dynamic damper d.

Thus, in this aspect of performance, the fluid transmission device can be endowed with a new dynamic damper function by utilizing the existing members of this device and without increasing the weight and accommodation space thereof, whereby the direct-connection drivable region of the motor vehicle can be expanded toward the lower speed range thereof (without degrading the oscillation characteristics of the fluid transmission device) to enhance the fuel consumption of the motor vehicle.

Next, there will be explained the operation of the fluid transmission device in the non-operating state of the direct coupling clutch 10 (during the drive of the motor vehicle in the operating state of the torque converter 2).

When the engine drives the front cover 14, the pump 4 unitary with the front cover 14 is driven. The pump 4 thus driven generates the stream of a fluid, by which the turbine 6 is driven. On this occasion, the stator 8 adjusts the direction of the fluid which flows from the turbine 6 toward the pump 4.

When the turbine 6 is driven, the transmission member 44 fixed thereto pushes the inner damper spring 46. The torque of the turbine 6 is transmitted to the driven plate 28 through the inner damper spring 46. The driven plate 28 is fixed to the turbine hub 32, from which the torque is transmitted to the unshown output shaft of the torque converter 2.

Although, in this aspect of performance, the turbine 6 is used as the member for generating the moment of inertia I0 of the dynamic damper d, it may well be replaced with the stator 8. The turbine 6 originally belongs to the constituents for forming the moment of inertia I2, whereas the stator 8 belongs to the constituents irrelevant to the moment of inertia I2. Both the members 6 and 8 can serve to generate the moment of inertia I0 of the dynamic damper d.

Now, the second aspect of performance of the present invention will be described.

Figure 3:
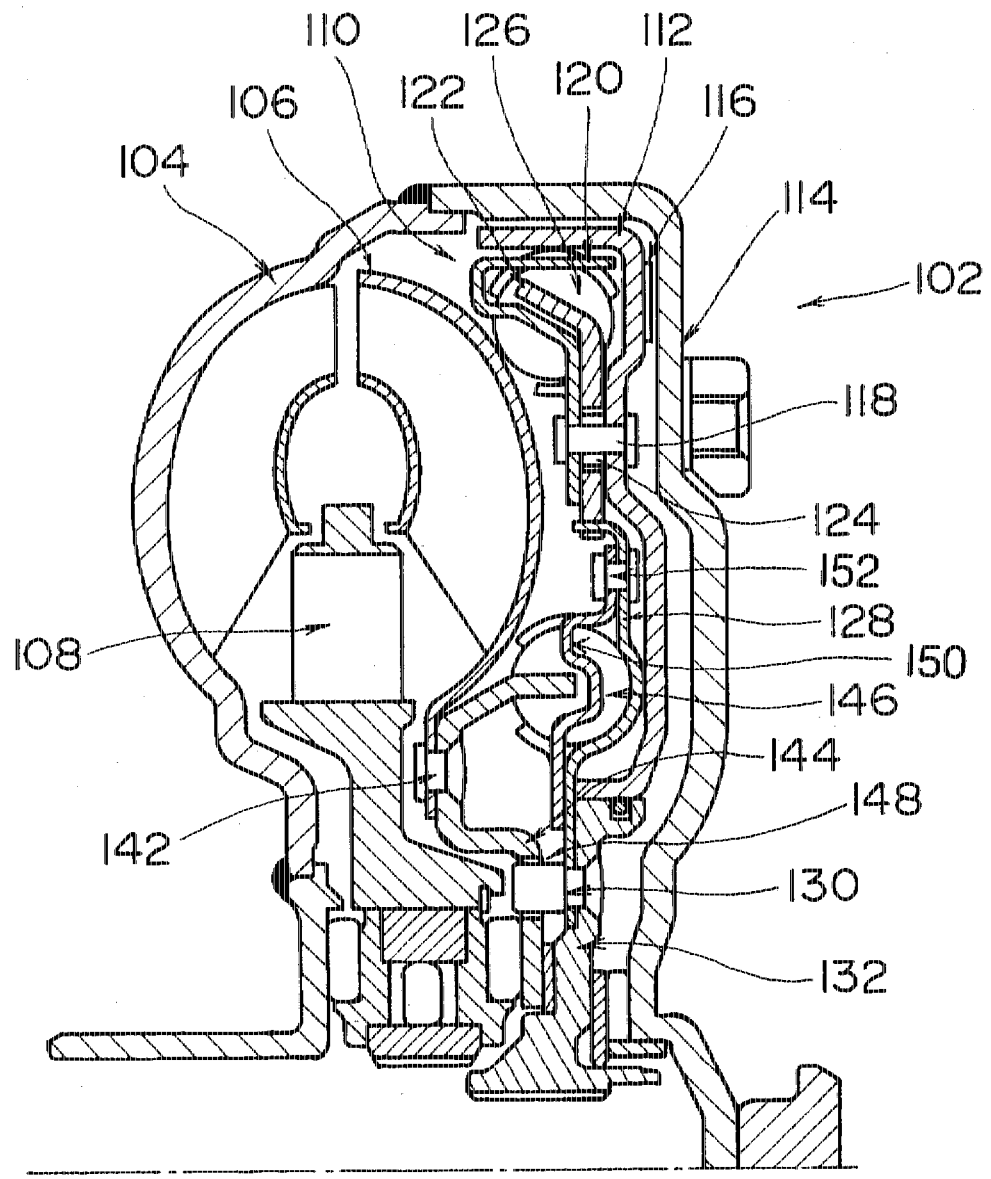
FIG. 3 is a vertical sectional view schematically showing the fluid transmission device according to the second aspect of performance.

FIG. 3 is a vertical sectional view schematically showing the fluid transmission device according to the second aspect of performance.

Since the second aspect of performance is basically the same as the first aspect of performance, numerals each having the same two lower digits shall be assigned to the identical or similar members in FIG. 3, and only different portions shall be explained. Incidentally, the third–fifteenth aspects of performance will be described in like ways.

As shown in FIG. 3, the point of difference of the second aspect of performance from the first aspect of performance is that a transmission member 144 is formed with a slot 148, into which a rivet 130 is inserted in assemblage. The rivet 130 and the slot 148 construct a stopper mechanism which prevents a turbine 106 and a turbine hub 132 from relatively rotating in excess of a predetermined angle.

In the first aspect of performance, when the motor vehicle is not in the direct-connection drive state, the torque is transmitted from the turbine 6 to the transmission member 44, and it is further transmitted to the turbine hub 32 through the inner damper spring 46. Accordingly, the great torque amplified by the torque converter 2 acts on the inner damper spring 46. In this regard, in the second aspect of performance, the rivet 130 is inserted in the slot 148 of the transmission member 144. Therefore, the rivet 130 functions as a stopper upon abutting against the end of the slot 148 of the transmission member 144, and it prevents the inner damper spring 146 from transmitting the torque in the close wire contact state thereof (in the state in which the spring is completely compressed to lose its elastic force). Thus, the durability of the inner damper spring 146 can be enhanced.

Besides, the inner damper spring 146 can be designed as the dedicated spring of the dynamic damper d in the direct-connection drive state of the motor vehicle. Thus, it is possible to arrange the spring which saves a required space and which is most suited to counter oscillations.

Now, the third aspect of performance of the present invention will be described.

The third aspect of performance consists in that, in the first aspect of performance shown in FIG. 2, elements which constitute the stopper mechanism are arranged on an identical circumference with substantially the same mounting diameter as the diameter of the inner damper spring 46.

Figure 4:
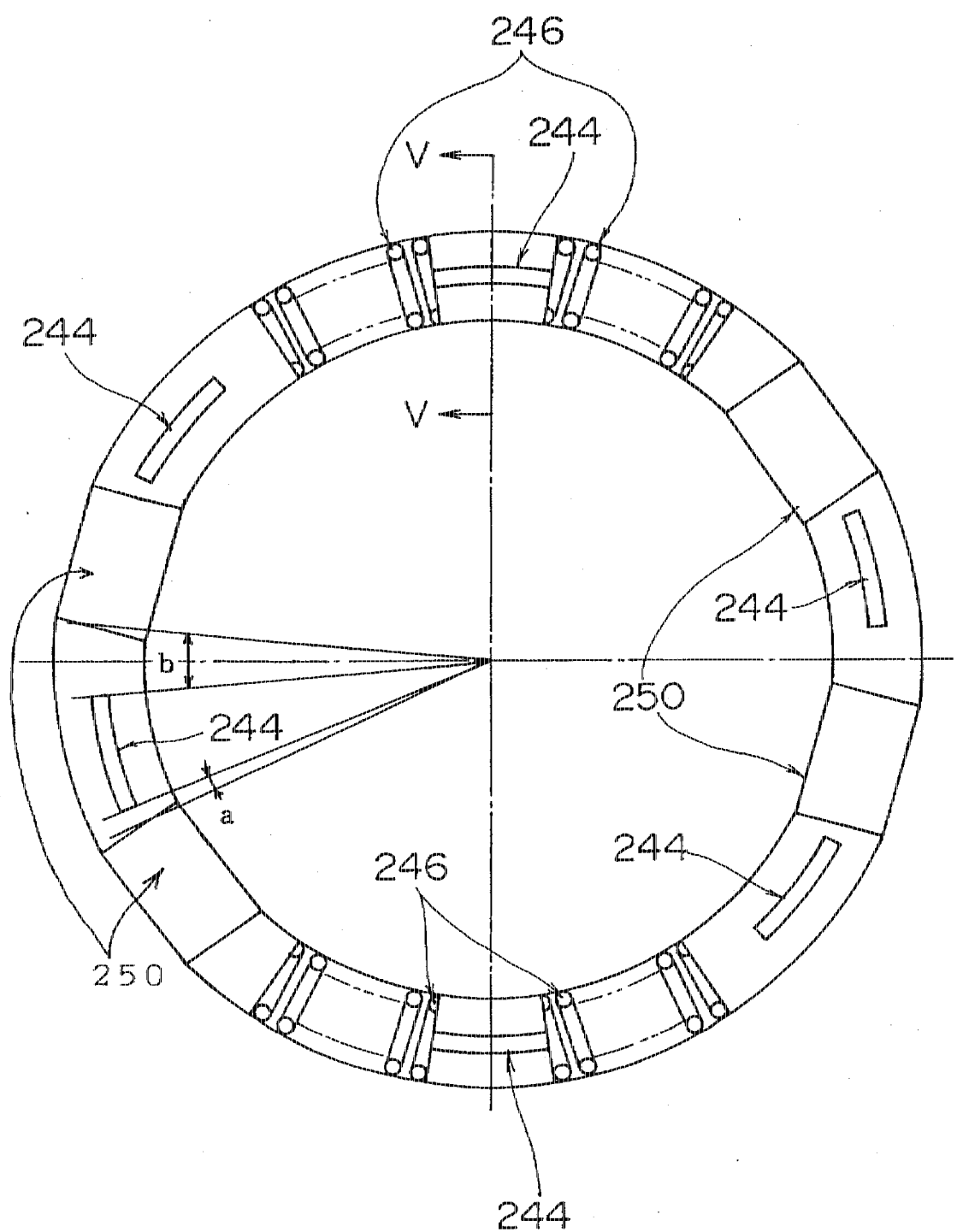
FIG. 4 is a front view of near inner damper springs showing the stopper mechanism for the damper device of the fluid transmission device according to the third aspect of performance.
Figure 5:
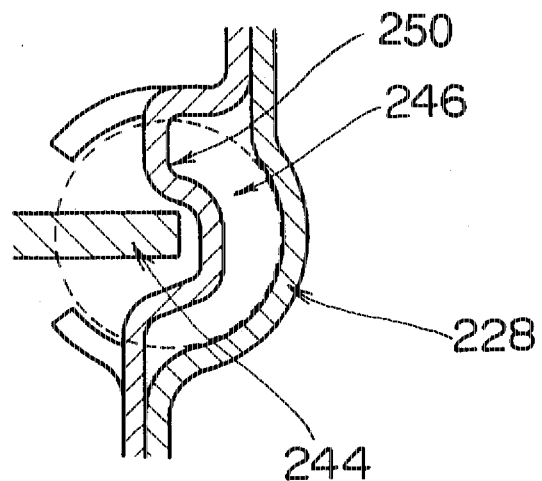
FIG. 5 is an enlarged sectional view taken along line V—V indicated in FIG. 4.

FIG. 4 is a front view in which the side of the turbine 6 is seen from inner damper springs 246. Herein, only members to be noticed are depicted. Referring to FIG. 4, numerals 244 designate a transmission member, and numerals 250 designate elastic stopper members made of rubber, resin or the like. Besides, an enlarged section taken along line V—V indicated in FIG. 4 is illustrated in FIG. 5. Numeral 228 in FIG. 5 denotes a driven plate, which is omitted from the illustration of FIG. 4. Incidentally, in the third aspect of performance, the inner damper springs 246 are arranged in the number of 4, and also the elastic stopper members 250 in the number of 4.

With the rotation of the turbine 6, the transmission member 244 is also rotated to push the inner damper springs 246. Thus, the transmission member 244 receives reaction forces from the inner damper springs 246 in both the plus and minus directions (the clockwise and counterclockwise directions) thereof.

Thereafter, when the angle of the rotation increases more, the transmission member 244 pushes the elastic stopper members 250 before the inner damper springs 246 fall into the close wire contact states. The elastic stopper members 250 absorb the torque when pushed, thereby to prevent the inner damper springs 246 from flexing in excess of predetermined magnitudes.

Figure 6:
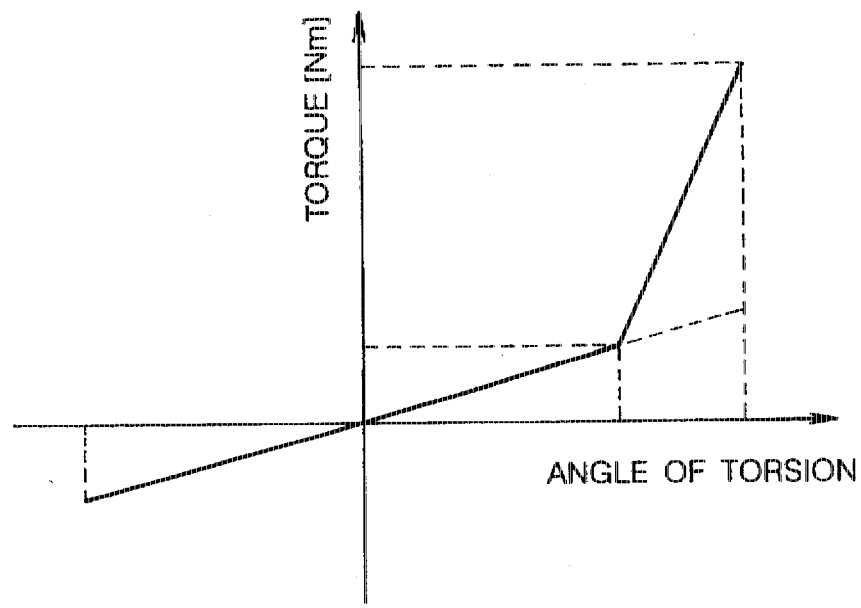
FIG. 6 is a graph showing the torsional rigidity of the inner damper spring.

Thus, stepped characteristics as shown in FIG. 6 are obtained regarding each of the inner damper springs 246. Moreover, since the transmission member 244 abuts against the elastic stopper members 250 as stated above, shocks ascribable to the touches between metals in the case of effecting the stopper function can be mitigated.

By the way, as illustrated in FIG. 4, the spacings (angles a and b) of the respectively adjoining elastic stopper members 250 from the corresponding ends of the intervening part of the transmission member 244 may well be made unequal so as to attain different characteristics for the rotations in the plus and minus directions.

According to the third aspect of performance, the stopper mechanism can be constructed by the minor changes of the existing components, thereby to enhance the productivity of the stopper mechanism and to minimize the occupation space thereof.

Also in the second aspect of performance, stepped characteristics similar to those shown in FIG. 6 can be obtained in such a way that elastic pieces of rubber, resin or the like are stuck to the ends of the slot 148 against which the rivet 130 abuts, or that the rivet 130 itself is covered with the elastic body.

Now, the fourth aspect of performance of the present invention will be described.

The fourth aspect of performance consists in that, not only the turbine, but also the stator is utilized as the member for generating the moment of inertia I0 of the dynamic damper d in FIG. 1, thereby to enlarge the inertia of the dynamic damper d with the intention of expanding the oscillation reduction region and improving the oscillating level.

Figure 7:
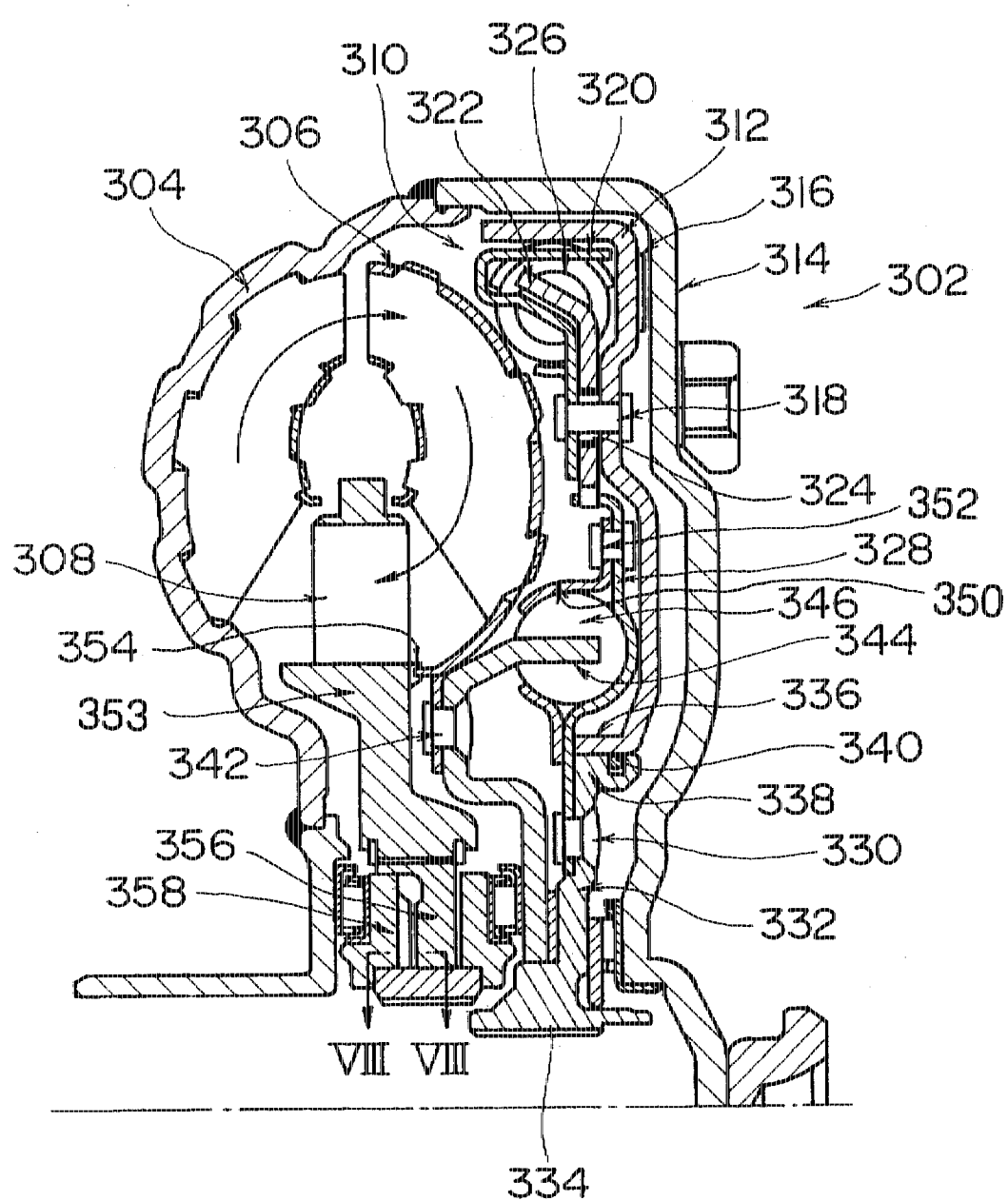
FIG. 7 is a vertical sectional view schematically showing the fluid transmission device according to the fourth aspect of performance.

FIG. 7 illustrates a schematic side sectional view of the fluid transmission device according to the fourth aspect of performance.

Referring to FIG. 7, a stator carrier 353 for supporting a stator 308 includes a lug 354. Disposed on the inner diameter side of the stator carrier 353 are a stator side member 356 which moves unitarily with the stator carrier 353, and a stationary shaft side member 358 which lies in opposition to the stator side member 356. Along with the stator 308, the stator side member 356 moves laterally as viewed in FIG. 7, depending upon the streams of the fluid. On the other hand, the stationary shaft side member 358 is fixed so as to be unrotatable.

Figure 8:
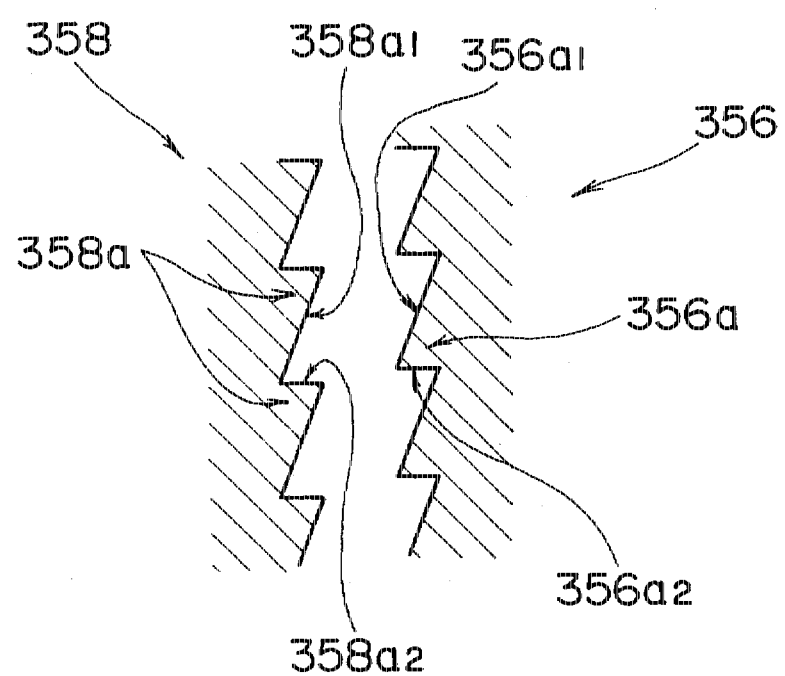
FIG. 8 is an enlarged sectional view taken along line VIII—VIII indicated in FIG. 7.

As seen from FIG. 8 showing a section taken along line VIII—VIII indicated in FIG. 7, the opposing surfaces of the stator side member 356 and stationary shaft side member 358 are respectively formed with teeth 356a and 358a. Each of the teeth 356a (or 358a) has a slant surface 356a1 (or 358a1) and a vertical surface 356a2 (or 358a2). The remaining construction of the fourth aspect of performance is the same as in the first aspect of performance illustrated in FIG. 2.

First, when the motor vehicle is driven without holding a direct coupling clutch 310 in direct connection (that is, when it is driven under the torque conversion operation of a torque converter 302), the stream of the fluid as indicated by arrows in FIG. 7 is developed by the rotation of a pump 304. Upon receiving a force based on the stream of the fluid, the stator 308 is moved leftwards as viewed in the figure. Thus, the stator side member 356 is also moved leftwards until the teeth 356a and those 358a mesh with the correspondent vertical surfaces 356a2 and 358a2 abutting on each other. Owing to the profiles of the teeth 356a and 358a, the stator 308 is allowed to rotate in only one direction.

In the case where the stator 308 is hindered from rotating, that is, it is fixed (in other words, where the working fluid acts in the direction of fixing the stator 308, in the so-called "converter range" of the torque converter 302), the working fluid of the torque converter 302 hits against the fixed stator 308 and increases the torque. On the other hand, in the case where the stator 308 is allowed to rotate (in other words, in the case of the so-called "coupling range"), the working fluid of the torque converter 302 is brought back into the pump 304 smoothly (that is, without receiving the reaction force of the stator 308).

Incidentally, the profiles of the teeth 356a and 358a are not restricted to those in this aspect of performance. Further, even a construction which differs from such a mechanism of the meshing engagement of the teeth may well be adopted as long as it allows only the unidirectional rotation.

Next, when the motor vehicle is driven with the direct coupling clutch 310 held in direct connection (that is, when it is driven without the torque conversion operation of the torque converter 302), the stream of the working fluid of the torque converter 302 is substantially at rest, and the stator 308, stator carrier 353 and stator side member 356 are moved rightwards as viewed in FIG. 7. Thus, the stator side member 356 comes away from the stationary shaft member 358, and the lug 354 of the stator carrier 353 comes into engagement with the inner end part of a turbine 306 as illustrated in FIG. 7.

As a result, the stator 308 is joined with a turbine hub 332 through a transmission member 344 and an inner damper spring 346, together with the turbine 306, thereby to function as the inertial member of the dynamic damper d. Accordingly, the moment of inertia I0 of the dynamic damper d can be increased to expand the oscillation reduction region and to improve the oscillating level.

Now, the fifth aspect of performance of the present invention will be described.

Figure 9:
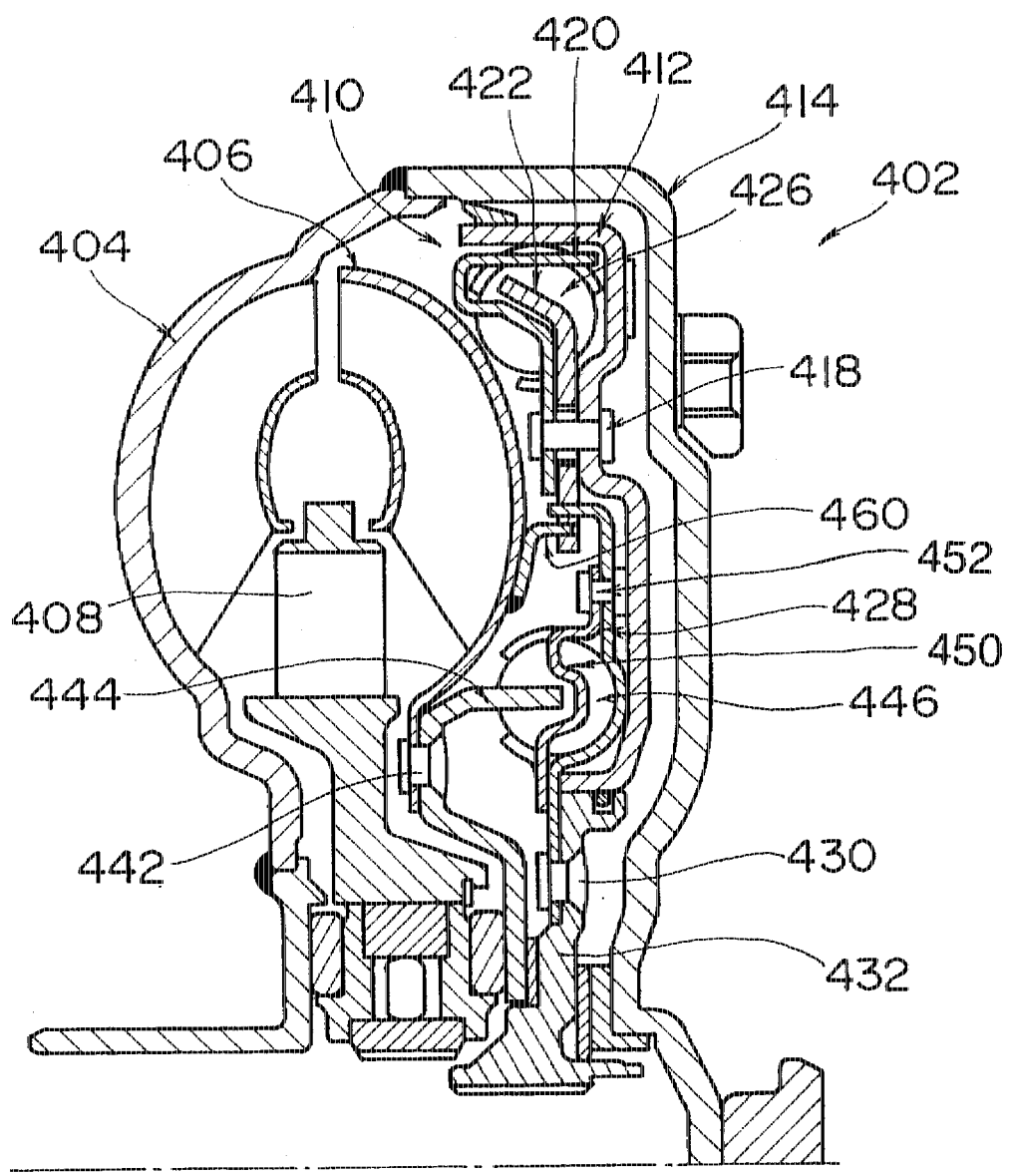
FIG. 9 is a vertical sectional view schematically showing the fluid transmission device according to the fifth aspect of performance.

FIG. 9 illustrates a schematic vertical sectional view of the fluid transmission device in the fifth aspect of performance.

As shown in FIG. 9, the fifth aspect of performance consists in that a protrusive piece 460 is provided at the side end part of a turbine 406 so as to deliver the torque directly from the protrusive piece 460 by a driven plate 428.

More specifically, when the motor vehicle is driven without holding a direct coupling clutch 410 in direct connection (that is, when it is driven under the torque conversion operation of a torque converter 402), the torque of the turbine 406 is directly transmitted from the protrusive piece 460 to the driven plate 428. Thus, the torque can be transmitted without the intervention of an inner damper spring 446.

In the foregoing second aspect of performance, the stopper mechanism is provided for restraining the inner damper spring 146 so as not to flex in excess of the predetermined magnitude. Here in the fifth aspect of performance, the flexure of the inner damper spring 446 can be perfectly restrained, and hence, the durability thereof can be enhanced still more.

Now, the sixth aspect of performance of the present invention will be described.

The sixth aspect of performance pertains to the characteristics of the inner damper springs 46, 146, 246, 346 and 446 in the foregoing aspects of performance and inner damper springs 546 etc. in the ensuing aspects of performance, in other words, the characteristics of the torsional rigidity K0 of the dynamic damper d.

In general, the fluctuating level of the torque of an engine increases more as the opening degree of a throttle valve is higher, and it decreases more as the revolving speed (r. p.m.) of the engine is higher. By the way, in the first aspect of performance shown in FIG. 2, in the case of the lockup-ON drive of the motor vehicle, the throttle opening degree is ordinarily low during a steady drive mode (during which the motor vehicle is driven with the trodden amount of an accelerator pedal held constant), and it is comparatively high during an accelerative drive mode.

Accordingly, if the resonance point of the dynamic damper d is set so as to be suitable for the steady drive mode of low vehicle speed, in the accelerative drive mode, since the throttle opening degree becomes high, even when the revolving speed of the engine has heightened, the fluctuating level of the engine torque does not become low, and a satisfactory dynamic damper effect is not attained.

In order to avoid the above drawback, the torsional rigidity K0 of the dynamic damper d in the accelerative drive mode may be rendered high relative to the torsional rigidity K0 in the steady drive mode, thereby to shift the resonance point of the dynamic damper d in the accelerative drive mode onto the high revolving speed side of the engine.

Figure 10:
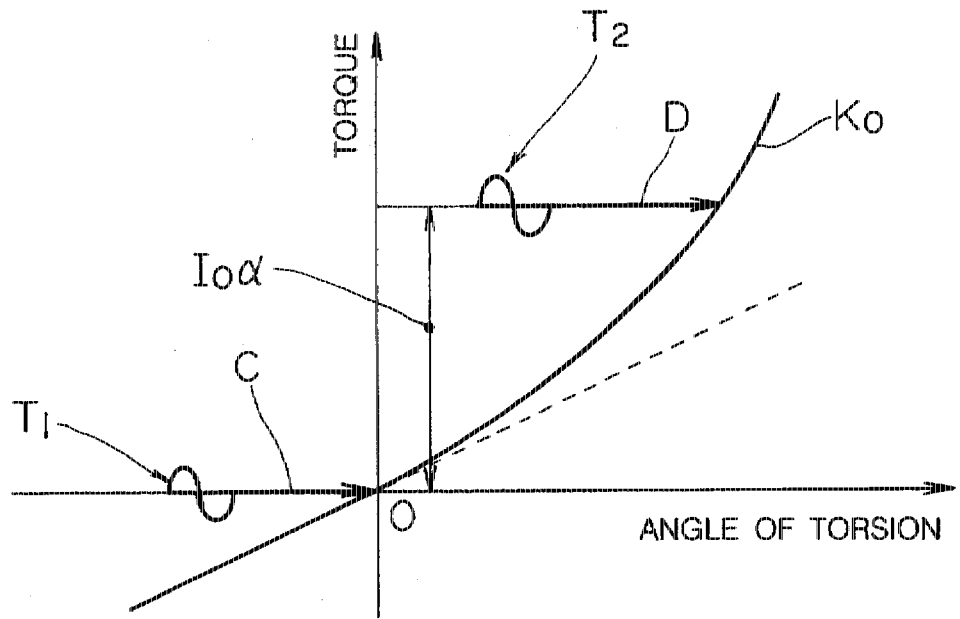
FIG. 10 is a graph showing the torsional rigidity of an inner damper spring according to the sixth aspect of performance.

For this contrivance, the characteristics of the torsional rigidity K0 of the dynamic damper d may be set as illustrated in the graph of FIG. 10.

Referring to FIG. 10, during the steady drive mode indicated by letter C, an average torque which acts on the (inner) spring (146, 246, 346 or 446) of the dynamic damper d is 0 (null), and the component T1 of an oscillating torque fluctuation is superposed on the null average torque. On the other hand, during the accelerative drive mode indicated by letter D, an average torque which acts on the (inner) spring (146, 246, 346 or 446) of the dynamic damper d increases an amount I0·α (where symbol α denotes the average angular acceleration of the engine) under the influence of the moment of inertia I0, and the component T2 of an oscillating torque fluctuation is superposed on the average torque I0·α.

Therefore, when the characteristics of the torsional rigidity K0 of the dynamic damper d are set as depicted in FIG. 10 (alternatively, when springs of, for example, two or three stages are employed so as to approximate the characteristics depicted in FIG. 10), favorable dynamic damper effects can be attained in both the steady drive mode and the accelerative drive mode.

In this manner, the sixth aspect of performance consists in that the characteristics of the inner damper spring are set as indicated by the symbol K0 (in a solid line) in FIG. 10, thereby to enhance the characteristics of the dynamic damper effect.

Now, the seventh aspect of performance of the present invention will be described.

The seventh aspect of performance pertains to the assemblage or mounting of the inner damper spring 46.

As explained before, the inner damper springs 46 (or 246) are assembled sandwiching the corresponding parts of the transmission member 44 (244), as shown in the front view of FIG. 4 by way of example. On this occasion, usually the oscillating amplitude of the transmission member 44 is of a minute angle (for example, 0.025 [rad] or so), but the set spring characteristics must be stably realized. Nevertheless, there are such problems that, as the general property of springs, the precisions of spring characteristics within the ranges of flexure percentages of 0~20 [%] and 80~100 [%] are not guaranteed, and that the assemblage plays between the transmission member 44 and the inner damper springs 46 must be 0 (null).

Figure 11:
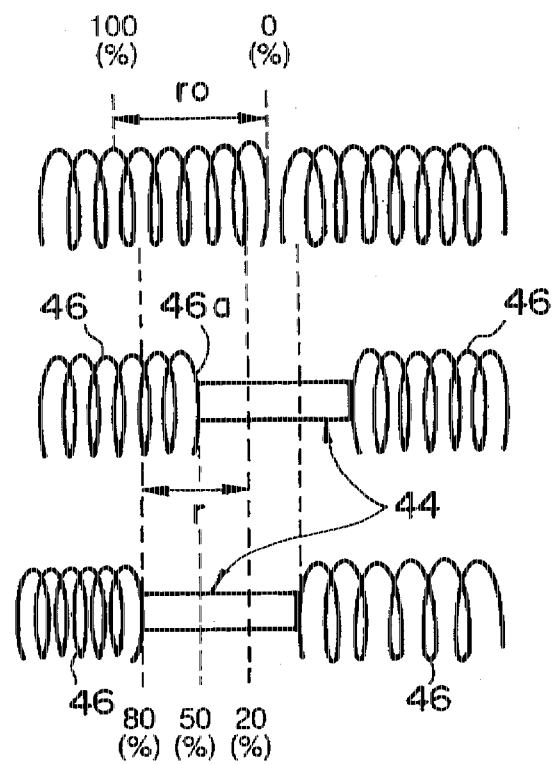
FIG. 11 is an explanatory view showing a method of assembling inner damper springs according to the seventh aspect of performance.

This aspect of performance therefore adopts a structure in which, as shown in FIG. 11, the transmission member 44 is sandwiched between the inner damper springs 46 in previously-biased(-pressed) states.

Referring to FIG. 11, the top picture illustrates the free states of the springs, and symbol r0 denotes the range of flexure percentages of 0~100 [%]. On the other hand, in this aspect of performance, as illustrated in the middle picture, the inner damper springs 46 are assembled with the transmission member 44 arranged therebetween so that the end part 46a of each spring 46 may be located at a position corresponding to a flexure percentage of about 50 [%], in the non-operating state of the transmission member 44. In this way, as illustrated in the bottom picture, even in the operating state of the transmission member 44, the end part 46a of each spring 46 falls within the range of flexure percentages of 20~80 [%] indicated by letter r.

Thus, a stable spring constant can be realized against the operation of the transmission member 44 which oscillates with the minute amplitude on both sides with respect to its assembled position.

Figure 12:
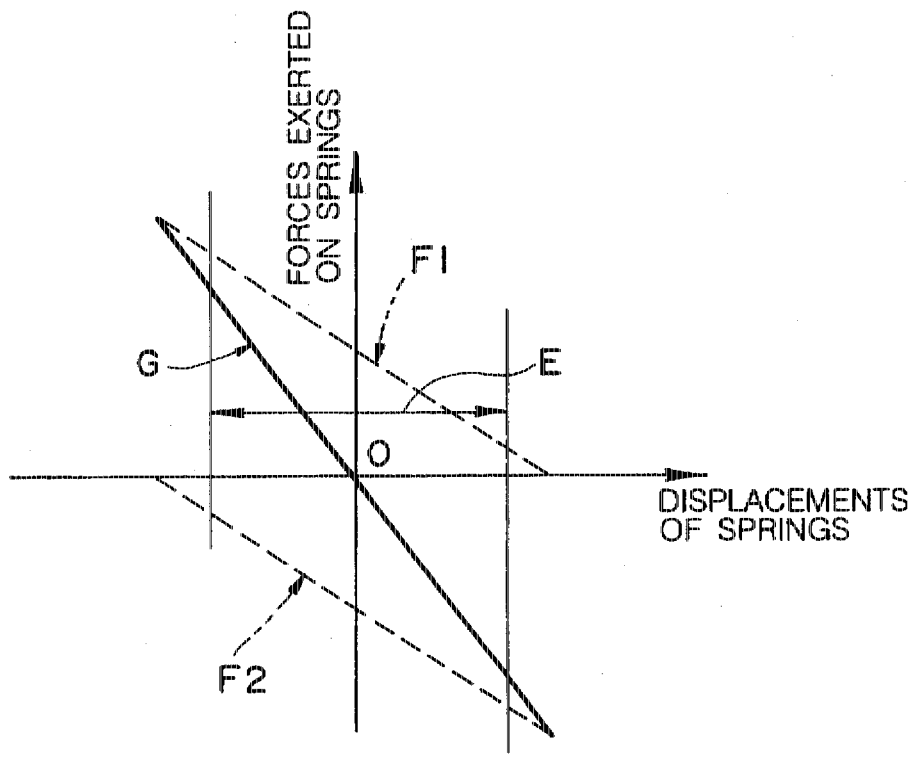
FIG. 12 is a graph showing the spring characteristics of the inner damper springs in the seventh aspect of performance.

Besides, FIG. 12 is a graph showing the rigidity characteristics of the springs 46 on this occasion.

Referring to FIG. 12, broken lines F1 and F2 indicate forces which the inner damper springs 46 at the left and right of the transmission member 44 in FIG. 11 exert on the transmission member 44, respectively. A solid line G indicates a force which acts on the transmission member 44 in the case of the leftward or rightward movement thereof, with the origin of the graph set at the position of the transmission member 44 in the no-load state thereof as assembled.

Here, when an extent E indicated in FIG. 12 is set as a damper region for use, the springs 46 are not used in the vicinities of the initial flexures or close wire contacts thereof, so that the desired spring constant can be accurately realized.

Now, the eighth aspect of performance of the present invention will be described.

Also the eighth aspect of performance pertains to the assemblage of the inner damper springs 46.

Figure 13:
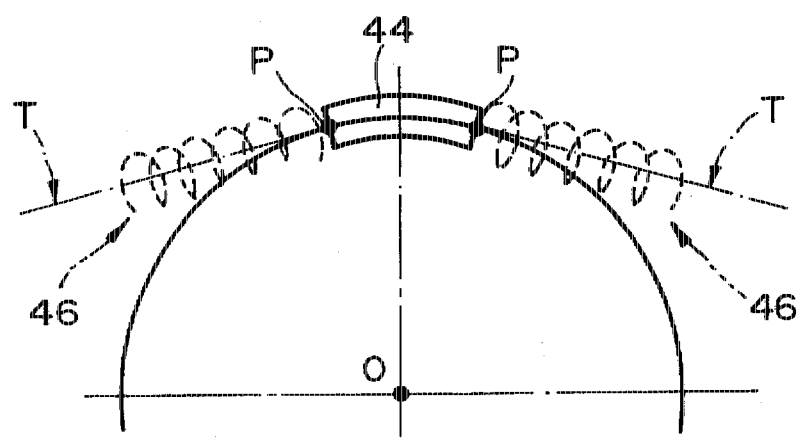
FIG. 13 is an explanatory view showing a method of assembling inner damper springs according to the eighth aspect of performance.

As illustrated in FIG. 13, the inner damper springs 46 are arranged in such a manner that the axes of the inner damper springs 46 are held in agreement with the directions of tangential lines T at the points of contact P between the transmission member 44 and these inner damper springs 46, the lines T being tangential to a circle which passes through the points of contact P, and which is concentric with the axial line.

In this manner, each of the inner damper springs 46 is arranged extending in the direction of the tangential line T, not along the concentric circle. Thus, the inner damper spring 46 can be mounted so that, when compressed by receiving a force from the transmission member 44, this inner damper spring 46 may undergo only a load in its axial direction, without an appreciable force component urging it in its radial direction. Accordingly, a frictional force which develops between the inner damper spring 46 and the retaining cover 50 as the envelope thereof can be almost nullified, thereby to enhance the durability of this spring and to attain spring characteristics of high stability.

Now, the ninth aspect of performance of the present invention will be described.

The ninth aspect of performance pertains to the structure of the transmission member 44 (interconnection portion for associating a turbine 506 with the inner damper spring 546).

Figure 14:
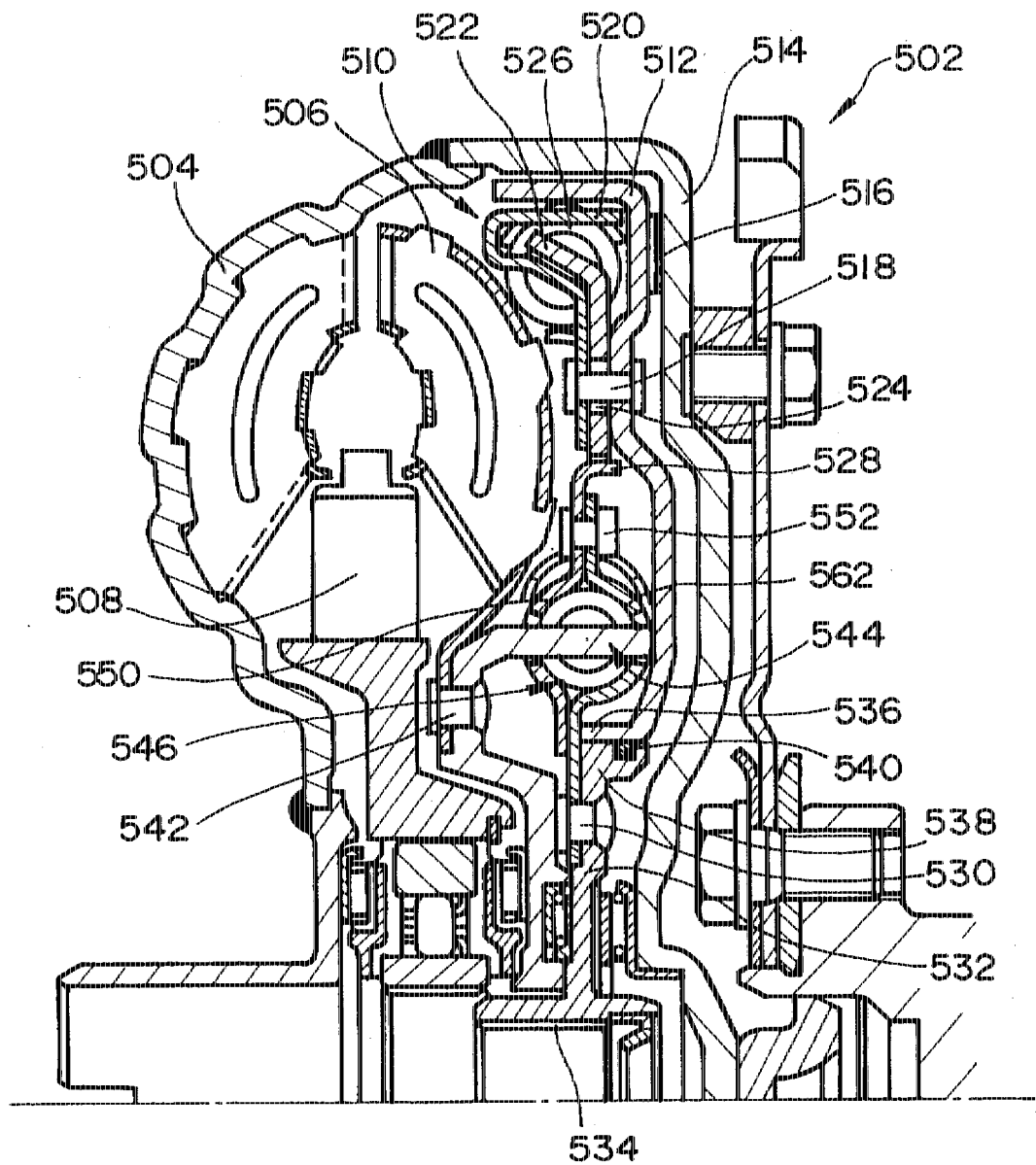
FIG. 14 is a vertical sectional view schematically showing the fluid transmission device according to the ninth aspect of performance.
Figure 15:
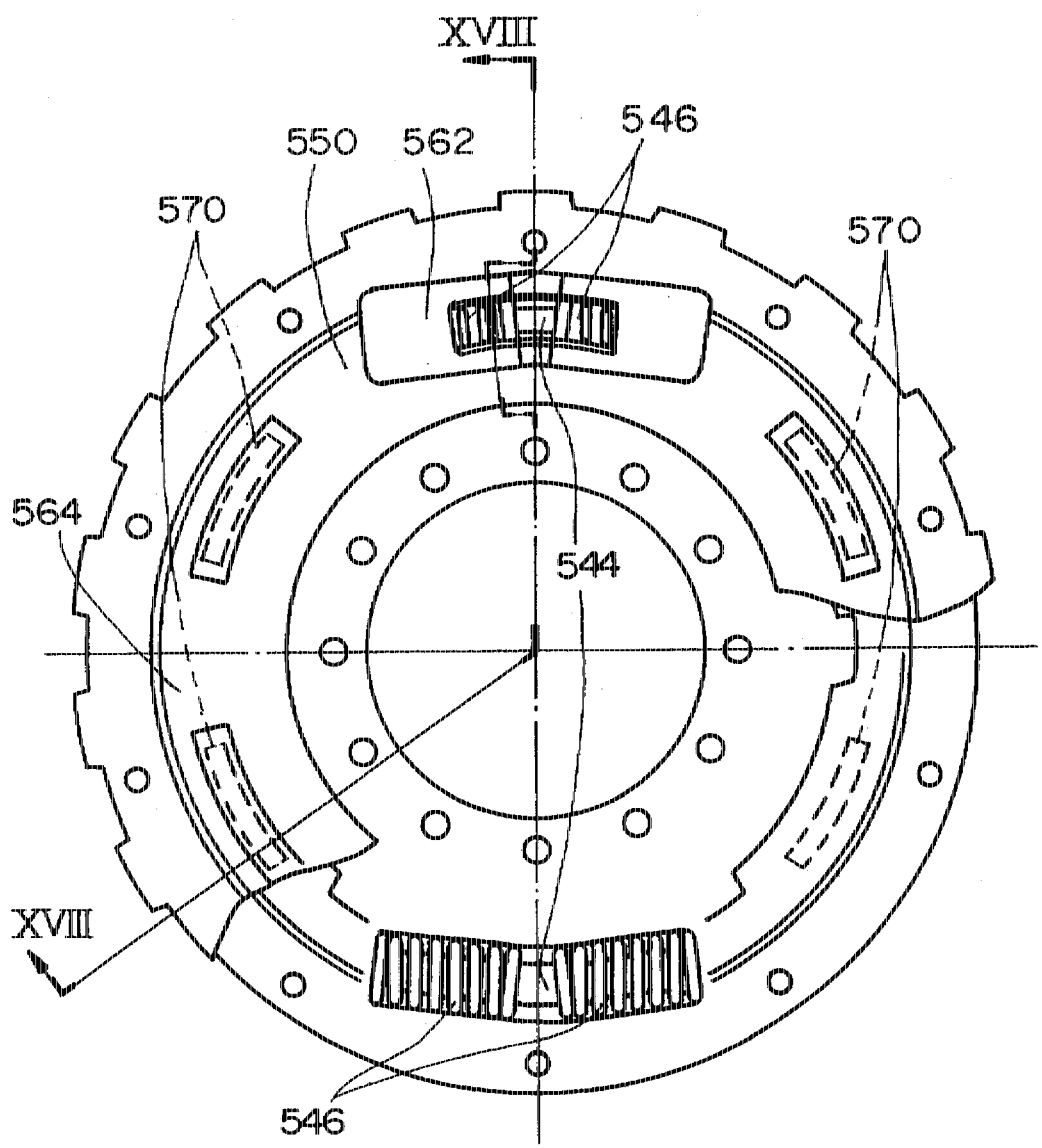
FIG. 15 is a front view showing the transmission member and the retaining cover in the ninth aspect of performance.

Namely, as illustrated in FIGS. 14 and 15, the transmission member 544 is stretched or lengthened so that the inner damper springs 546 can be accurately urged (pressed) in the axial directions thereof.

On this occasion, an axial play of specific magnitude is existent inside a torque converter 502. Therefore, there may be a possibility that the transmission member 544 moves leftwards as viewed in FIG. 14 at the time of a damper operation. Accordingly, if the transmission member 544 is stretched to just upon the end surface of the inner damper springs 546, the transmission member 544 might come off to abut on only part of the corresponding end surface of the inner damper spring 546, as shown in FIG. 16B. In the state of FIG. 16B, the inner damper spring 546 is pushed aslant and fails to realize desired spring characteristics.

Figure 16A:
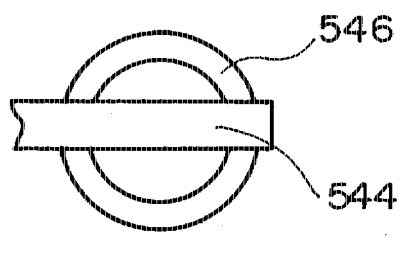
FIGS. 16A and 16B are explanatory views each showing the relationship of the transmission member to the inner damper spring.
Figure 16B:
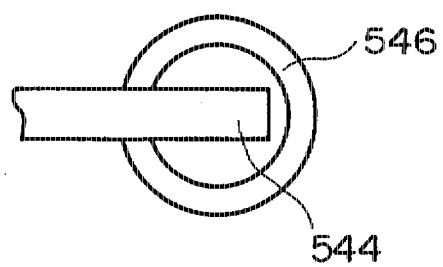

In this aspect of performance, therefore, as shown in FIG. 16A, the transmission member (interconnection portion) 544 is lengthened sufficiently relative to the axial play magnitude inside the torque converter 502, so as to penetrate through the cylindrical portion 562 (FIG. 14) of a retaining cover 550 in which the inner damper spring 546 is enveloped.

Figure 17:
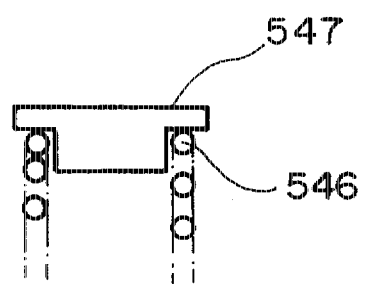
FIG. 17 is an explanatory view showing the cap which is put on the inner damper spring.

In lieu of the structure in which the transmission member 544 is stretched to penetrate through the cylindrical portion 562 of the retaining cover 550, it is thought out that, as seen from FIG. 17, a cap 547 or the like is put on the end surface of the inner damper spring 546 so as to push the cap 547 or the like by means of the transmission member (interconnection portion) 544. However, the cost of the damper device increases in correspondence with the additional component.

Accordingly, this aspect of performance can prevent the partial abutment and attain the stable favorable spring characteristics without incurring rise in the cost.

Now, the tenth aspect of performance of the present invention will be described.

As shown in FIG. 15, the retaining cover 550 for the inner damper springs 546 has slot-formed stopper portions 570 in that part 564 other than the cylindrical portions 562 in which the inner damper springs 546 are not enveloped (and which shall be called the "general shape portion"). The stopper portions 570 function as a stopper in such a way that the projecting parts of the transmission member 544 move in the stopper portions 570 to abut against the ends thereof.

The tenth aspect of performance pertains to the shape of each stopper portion 570.

Figure 18:
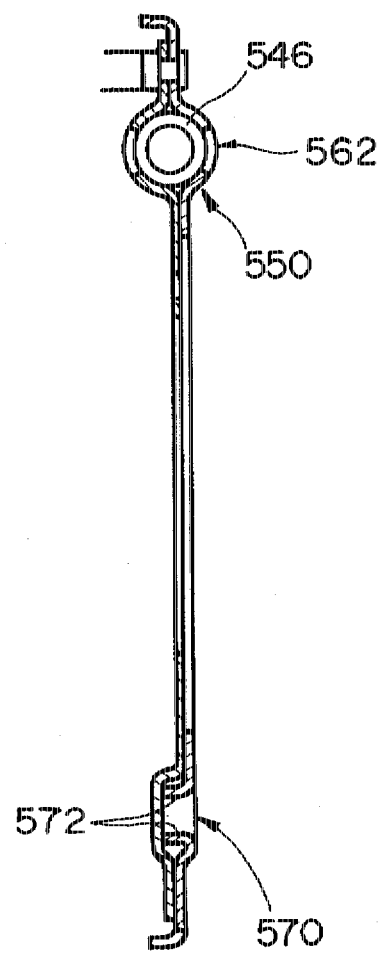
FIG. 18 is a sectional view taken along line XVIII—XVIII indicated in FIG. 15.

A sectional view taken along line XVIII—XVIII indicated in FIG. 15 is illustrated in FIG. 18. Besides, an enlarged view of the stopper portion 570 is illustrated in FIG. 19.

Figure 19:
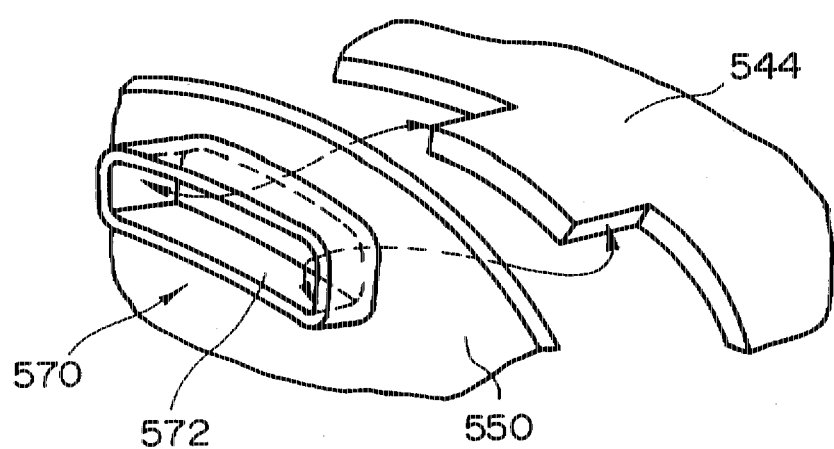
FIG. 19 is an enlarged view showing the shape of the stopper portion of a retaining cover according to the tenth aspect of performance.

This aspect of performance consists in putting the stopper portion 570 into the shape in which a flange 572 is erected at the slot-formed peripheral edge thereof as shown in FIGS. 18 and 19.

As a result, when the transmission member 544 rotates relatively to the retaining cover 550 and abuts against the stopper 570, the load of the retaining cover 550 is received by the surfaces (areas) of the stopper 570 as seen from FIG. 19. Thus, the surface pressure to which the stopper 570 is subjected is lowered to enhance the durability of the retaining cover 550.

Moreover, owing to that structure of each stopper portion 570 in which the flange 572 is erected over the whole periphery of the slot form, the part of the stopper portion 570 surrounding the slot exhibits an enhanced rigidity and is deformed only slightly under the load, so that the spring characteristics of the inner damper springs 546 are not adversely affected. Furthermore, since the flange 572 can be formed by press work, no appreciable rise in cost is incurred.

Now, the eleventh aspect of performance of the present invention will be described.

The eleventh aspect of performance pertains to the shape of the cylindrical portion 562 of the retaining cover 550.

Figure 22:
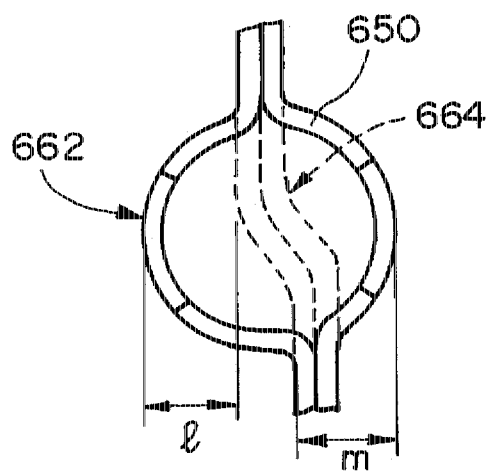
FIG. 22 is a vertical sectional view showing the shape of the cylindrical portion of a retaining cover in the conventional style.
Figure 23:
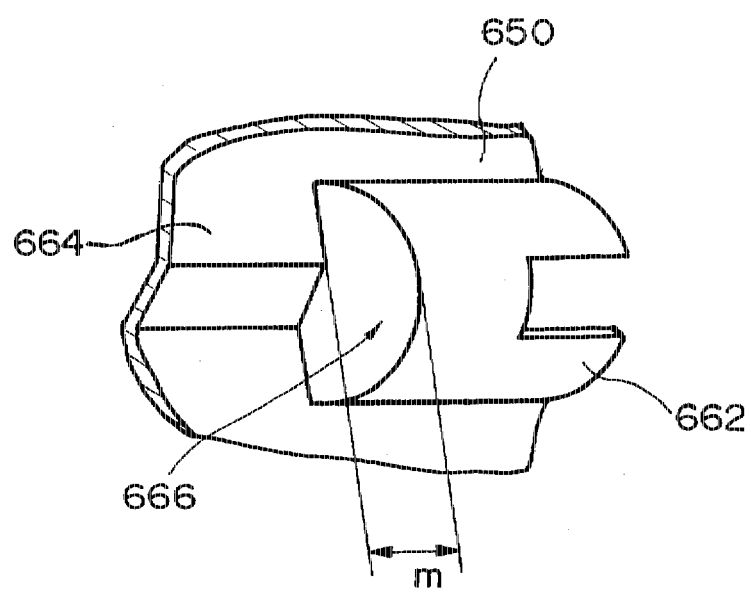
FIG. 23 is a perspective view showing the shape of the cylindrical portion depicted in FIG. 22.

FIGS. 22 and 23 are a vertical sectional view and a perspective view showing the cylindrical portion 662 of a retaining cover 650 in the conventional style, respectively.

In a case where the steps l and m of the cylindrical portion 662 of the retaining cover 650 relative to the general shape portion 664 thereof are great as shown in FIG. 22, the cylindrical portion 662 cannot be successfully formed by press work in some cases. By way of example, a hole appears in the bottom 666 of the cylindrical portion 662 shown in FIG. 23.

Figure 20:
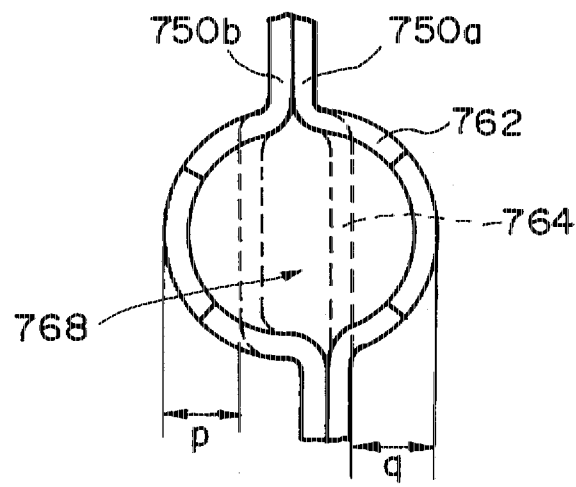
FIG. 20 is a vertical sectional view showing the shape of the cylindrical portion of a retaining cover according to the eleventh aspect of performance.
Figure 21:
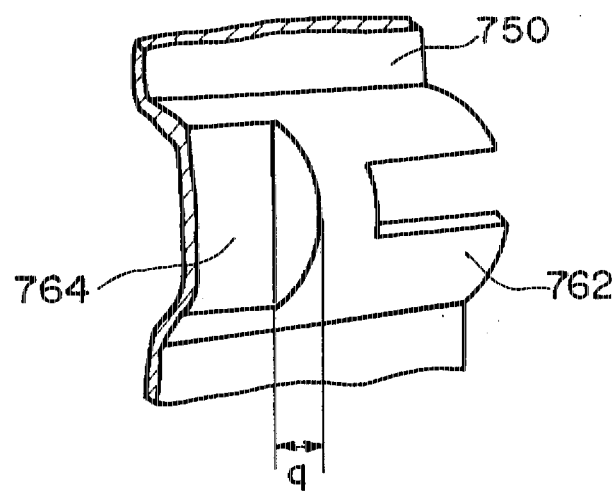
FIG. 21 is a perspective view showing the shape of the cylindrical portion depicted in FIG. 20.

In this aspect of performance, therefore, the general shape portion 764 of a retaining cover 750 is put into a stepped shape so as to make small its steps p and q relative to the cylindrical portion 762 thereof, as shown by a vertical sectional view in FIG. 20 and by a perspective view in FIG. 21.

Thus, the cylindrical portion 762 can be easily formed by the press work. Moreover, owing to the stepped shape of the general shape portion 764, when the two retaining cover elements (plates) 750a and 750b of the retaining cover 750 are joined to each other as shown in FIG. 20, a space 768 for holding the inner damper spring (the elastic body not shown) is formed in the joined structure, and the inner damper spring can be supported by a plurality of places. Accordingly, the spring retaining ability of the retaining cover 750 can be enhanced to prevent the characteristics of the spring from changing due to any disturbance. Furthermore, the rigidity of the retaining cover 750 itself is enhanced owing to the bag- or pouch-like structure thereof.

Now, the twelfth aspect of performance of the present invention will be described.

The twelfth–fifteenth aspects of performance of the present invention pertain to controlling the oscillations which develop anew in the new frequency region due to adding the new dynamic damper function d.

Figure 24:
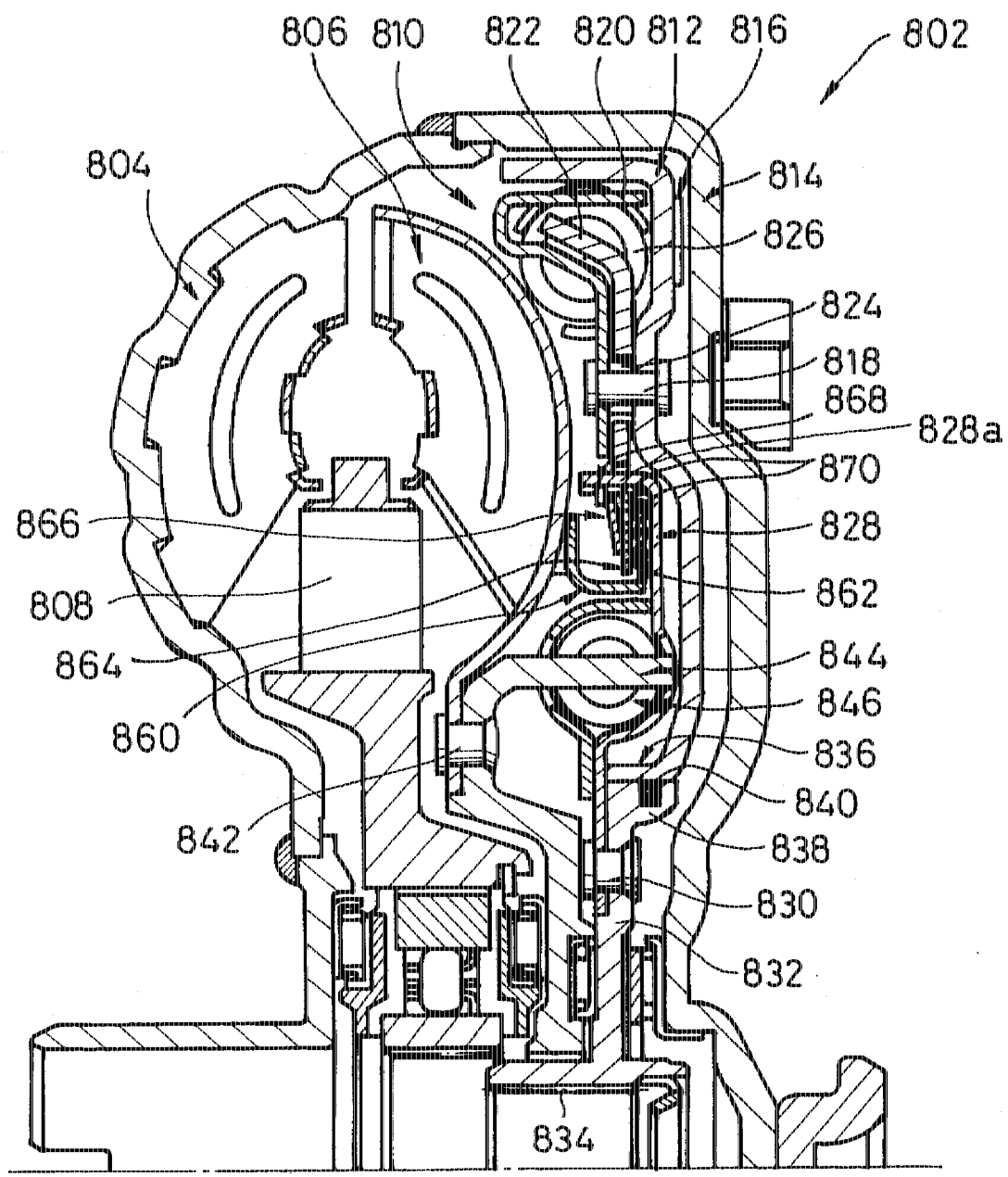
FIG. 24 is a vertical sectional view schematically showing the fluid transmission device according to the twelfth aspect of performance.

As shown in FIG. 24, a disc hub 860 is integrally mounted on the turbine 806. A disc 862 is attached to the end part of the disc hub 860 so as to face the driven plate 828 and to be axially slidable. Besides, a plate 864 is disposed on the side of the disc 862 nearer the turbine 806 while opposing to this disc 862. The plate 864 is so mounted that the outer diameter side thereof is axially movable along the outer diameter side end 828a of the driven plate 828 and is unrotatable relatively to the driven plate 828. Moreover, the plate 864 is urged toward the disc 862 by a spring element 866. The spring element 866 has its axial movement restrained by a snap ring 868.

Friction members 870 are respectively interposed between the disc 862 and the plate 864 and between the disc 862 and the driven plate 828. Such friction members 870 may be respectively disposed on both the confronting surfaces of the mated constituents, or the friction member 870 may well be disposed on only one of the confronting surfaces of the mated constituents. Alternatively, at least either of the confronting surfaces may be machined so as to generate a frictional force which attains a predetermined effect.

The twelfth aspect of performance operates as described below.

When the direct coupling clutch 810 has been actuated, the lockup piston 812 is moved rightwards as viewed in FIG. 24 and pressed against the side of the front cover 814 under the action of a hydraulic pressure (by a known construction). The front cover 814 is driven by an engine, not shown. Accordingly, a torque delivered from the engine is directly transmitted to the lockup piston 812 through the lining 816.

The drive plate 820 integral with the lockup piston 812 pushes one end of the outer damper spring 826. In consequence, the other end of the outer damper spring 826 pushes the intermediate plate 822. The torque transmitted to the intermediate plate 822 is transmitted through the driven plate 828 to the turbine hub 832 which is an output member.

As stated before, the turbine 806 is arranged so as to be rotatable relatively to the turbine hub 832 through the inner damper spring 846 as well as the transmission member 844 fixed to the turbine 806. That is, the turbine 806 being the member which does not contribute to the torque transmission under the operating state of the direct coupling clutch 810, is resiliently supported on the turbine hub 832 being the member which contributes to the torque transmission, through the inner damper spring 846 being an elastic body.

Here, the disc 862 and the plate 864 are held in touch through the friction member 870, and they are urged toward the driven plate 828 by the spring element 866. Thus, in the case where drags based on the frictional forces are respectively generated between the plate 864 and the disc 862, and between the driven plate 828 and the disc 862, it is consequently permitted to lower the levels of those oscillations of the fluid transmission device proper which develop anew.

In this manner, according to the twelfth aspect of performance, the new oscillations ascribable to endowing the fluid transmission device with the new dynamic damper function can also be suppressed, and the oscillating levels of the inertia of the fluid transmission device can be rendered an allowable value or below in a wide frequency range.

Now, the thirteenth aspect of performance of the present invention will be described.

Figure 25:
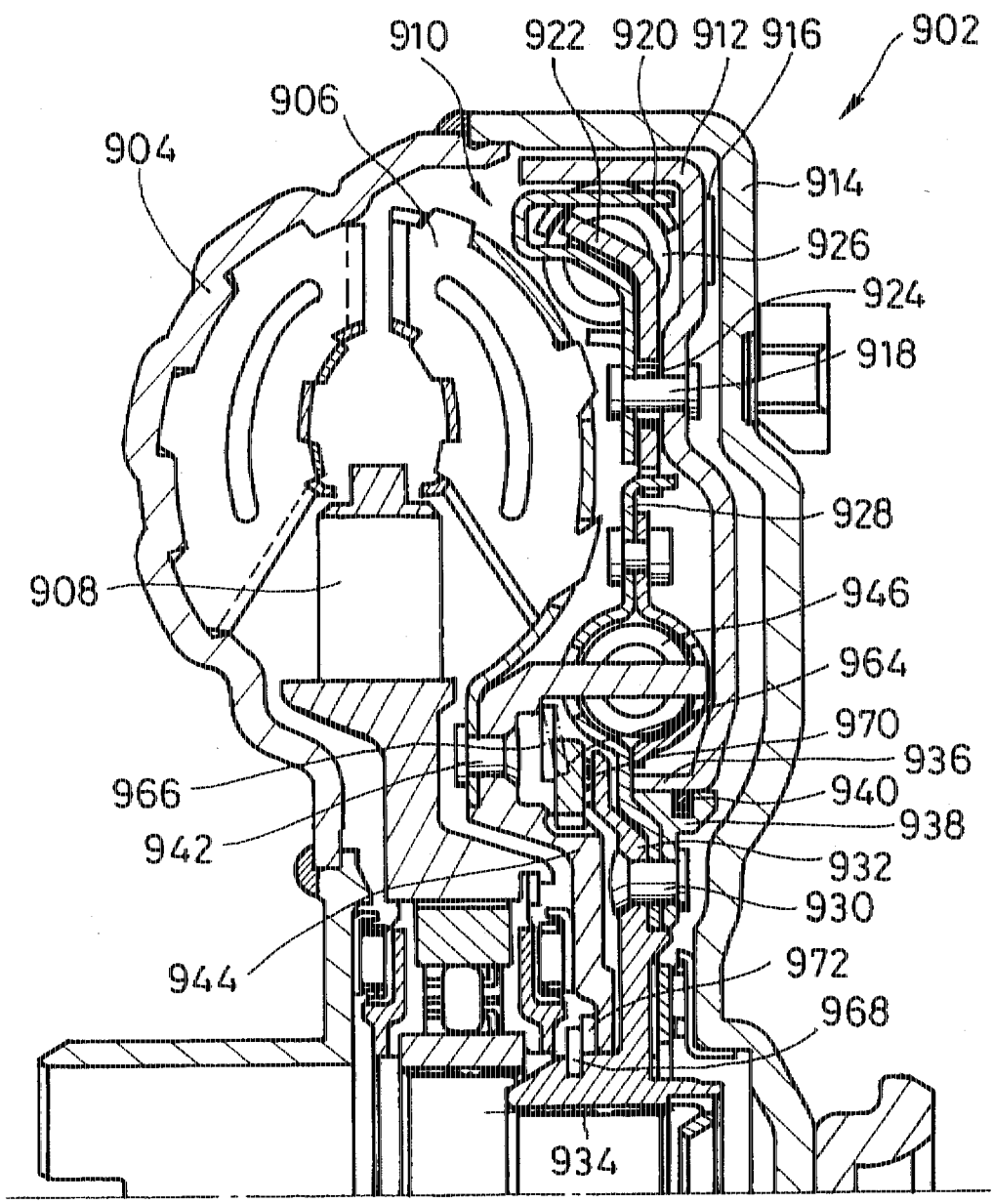
FIG. 25 is a vertical sectional view schematically showing the fluid transmission device according to the thirteenth aspect of performance.

FIG. 25 is a vertical sectional view schematically showing a fluid transmission device according to the thirteenth aspect of performance.

The thirteenth aspect of performance consists in that the two friction members 870 in the preceding twelfth aspect of performance are replaced with a single friction member 970, which is mounted at a different position.

Referring to FIG. 25, a plate 964 is interposed between the transmission member 944 and the turbine hub 932. The plate 964 is slidable in only the axial direction of the fluid transmission device. The friction member 970 is disposed between the plate 964 and the turbine hub 932. This friction member 970 may be mounted on either the plate 964 or the turbine hub 932.

A spring element 966 is interposed between the transmission member 944 and the plate 964. The spring element 966 urges the plate 964 toward the turbine hub 932. Thus, in the case where the turbine 906 and the turbine hub 932 are relatively rotated, a drag based on a frictional force is generated between the plate 964 and the turbine hub 932. It is consequently permitted to suppress the oscillations which develop anew.

Incidentally, the reaction force of the turbine hub 932 against the urging pressure of the spring element 966 is received by a snap ring 968 through a washer (or bearing) 972. Besides, since the remaining construction is basically the same as in the first or twelfth aspect of performance stated before, it shall be omitted from description on the condition that numerals each having the same two lower digits are assigned to the identical or similar members in FIG. 25.

Now, the fourteenth aspect of performance of the present invention will be described.

Figure 26:
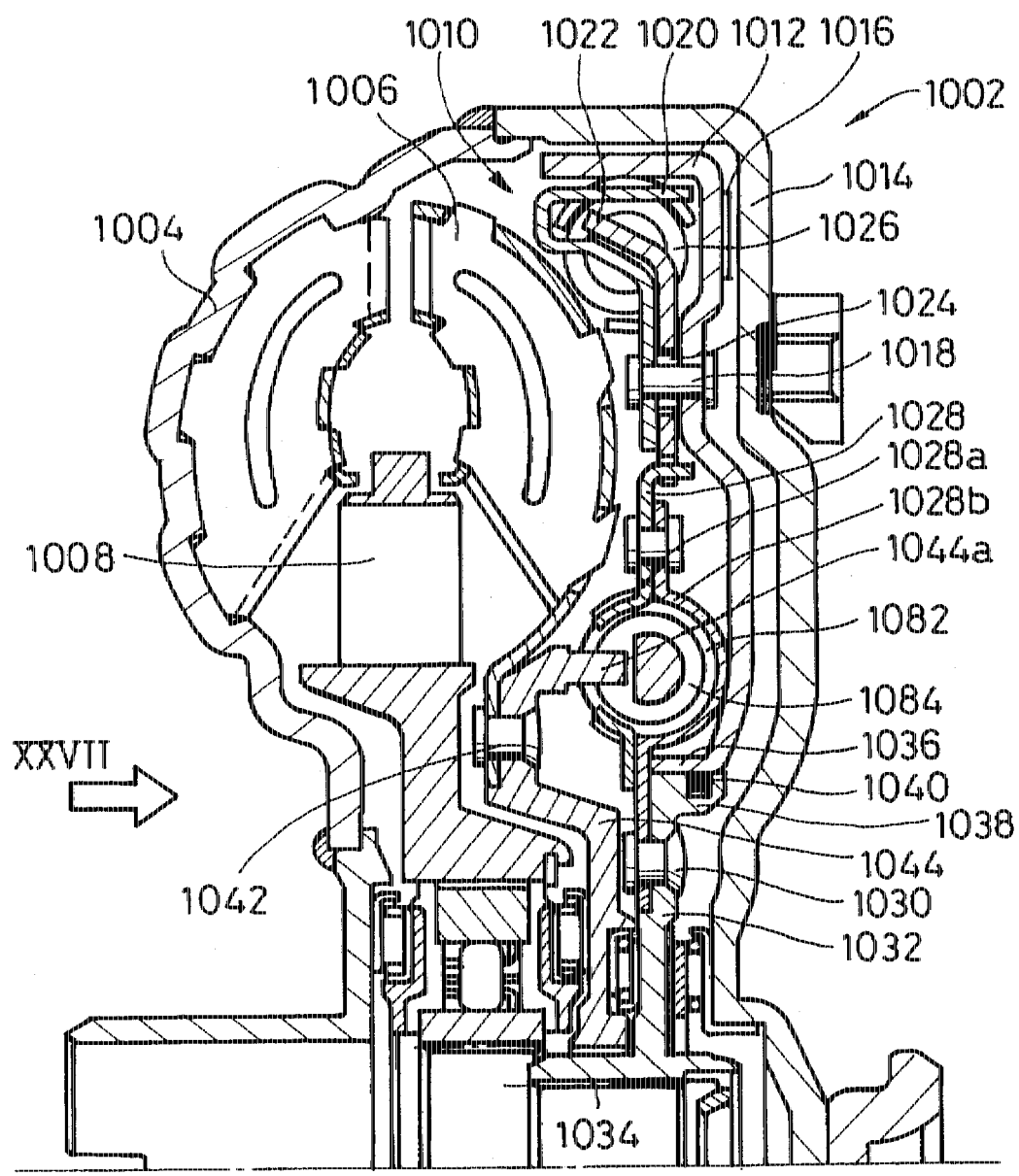
FIG. 26 is a vertical sectional view schematically showing the fluid transmission device according to the fourteenth aspect of performance.

FIG. 26 is a vertical sectional view schematically showing a fluid transmission device according to the fourteenth aspect of performance.

Figure 27:
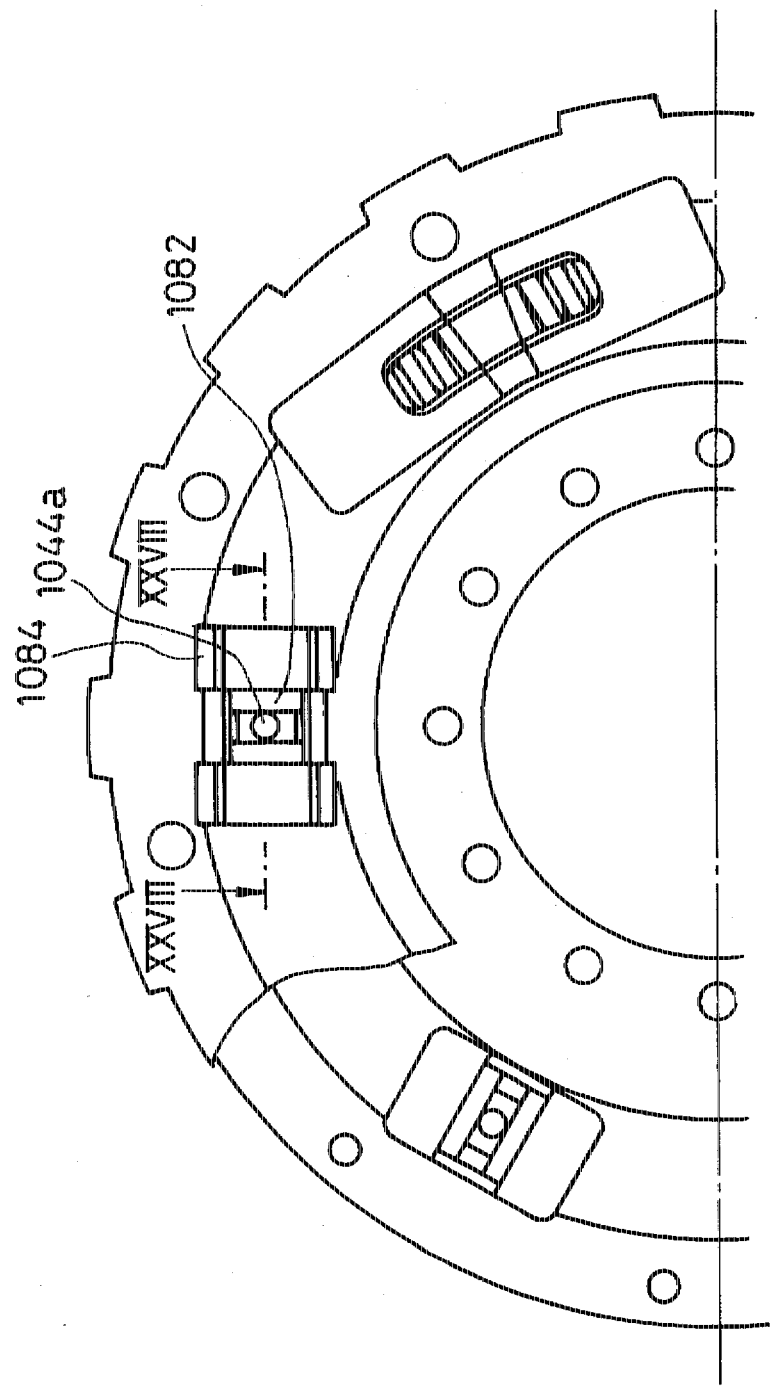
FIG. 27 is a view of the viscous damping portion seen in the direction of arrow XXVII indicated in FIG. 26.

Besides, a view seen in the direction of arrow XXVII indicated in FIG. 26 is depicted in FIG. 27. Further, a sectional view taken along line XXVIII—XXVIII indicated in FIG. 27 is depicted in FIG. 28.

The fourteenth aspect of performance consists in that viscous damping means is adopted as the oscillation suppression means.

Referring to FIG. 26, a cylinder 1082 is fixed in the cage portions 1028a and 1028b of the driven plate 1028 and is disposed integrally with the turbine hub 1032. A piston 1084 is slidably fitted in the cylinder 1082. Besides, as shown in FIG. 28, the piston 1084 is centrally formed with a groove 1084a, and a pawl portion 1044a at the tip end of the transmission member 1044 is caught in the groove 1084a. The inner Spaces 1082a and 1082b of the cylinder 1082 are filled up with oil.

Figure 28:
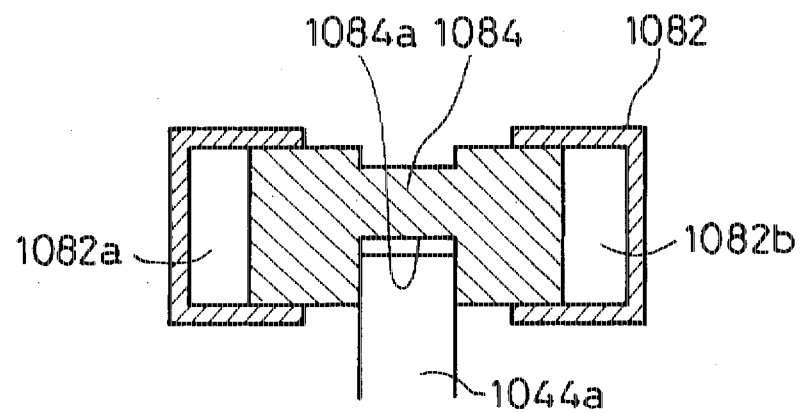
FIG. 28 is a sectional view taken along line XXVIII—XXVIII indicated in FIG. 27.

When the transmission member 1044 is rotated relatively to the turbine hub 1032, the pawl portion 1044a moves rightwards or leftwards as viewed in FIG. 28. As a result, also the piston 1084 moves rightwards or leftwards. Herein, the inner spaces 1082a and 1082b of the cylinder 1082 are filled up with the oil. Therefore, when a pressure is exerted on the oil by the movement of the piston 1084, the oil flows out through the clearances between the piston 1084 and the cylinder 1082. On this occasion, the operation of the transmission member 1044 as the dynamic damper is limited by the viscosity of the oil. Thus, the oscillations which develop anew can be suppressed.

By the way, the remaining construction is similar to that of the first or twelfth aspect of performance stated before, and it shall be omitted from description on the condition that numerals each having the same two lower digits are assigned to the identical or similar members in FIG. 26.

Figure 29:
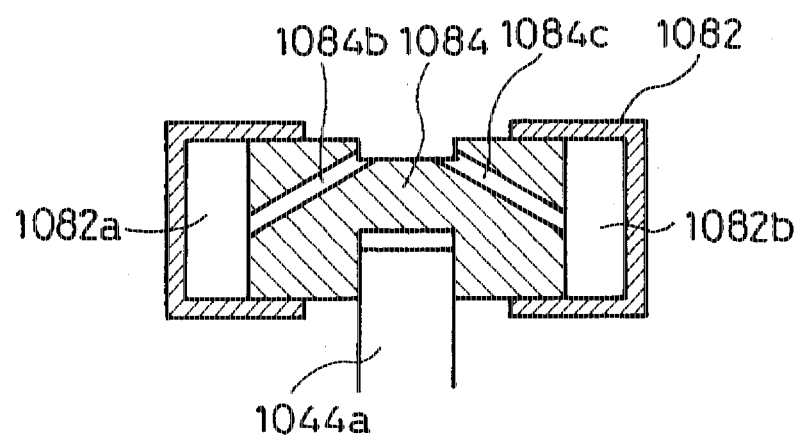
FIG. 29 is a sectional view showing a modified example of piston indicated in FIG. 28.

Alternatively, as illustrated in FIG. 29, the piston 1084 may well be provided with through holes 1084b and 1084c which bring the respective inner spaces 1082a and 1082b of the cylinder 1082 into communication with the exterior, thereby to attain the optimum damping magnitude.

Now, the fifteenth aspect of performance of the present invention will be described.

Figure 30:
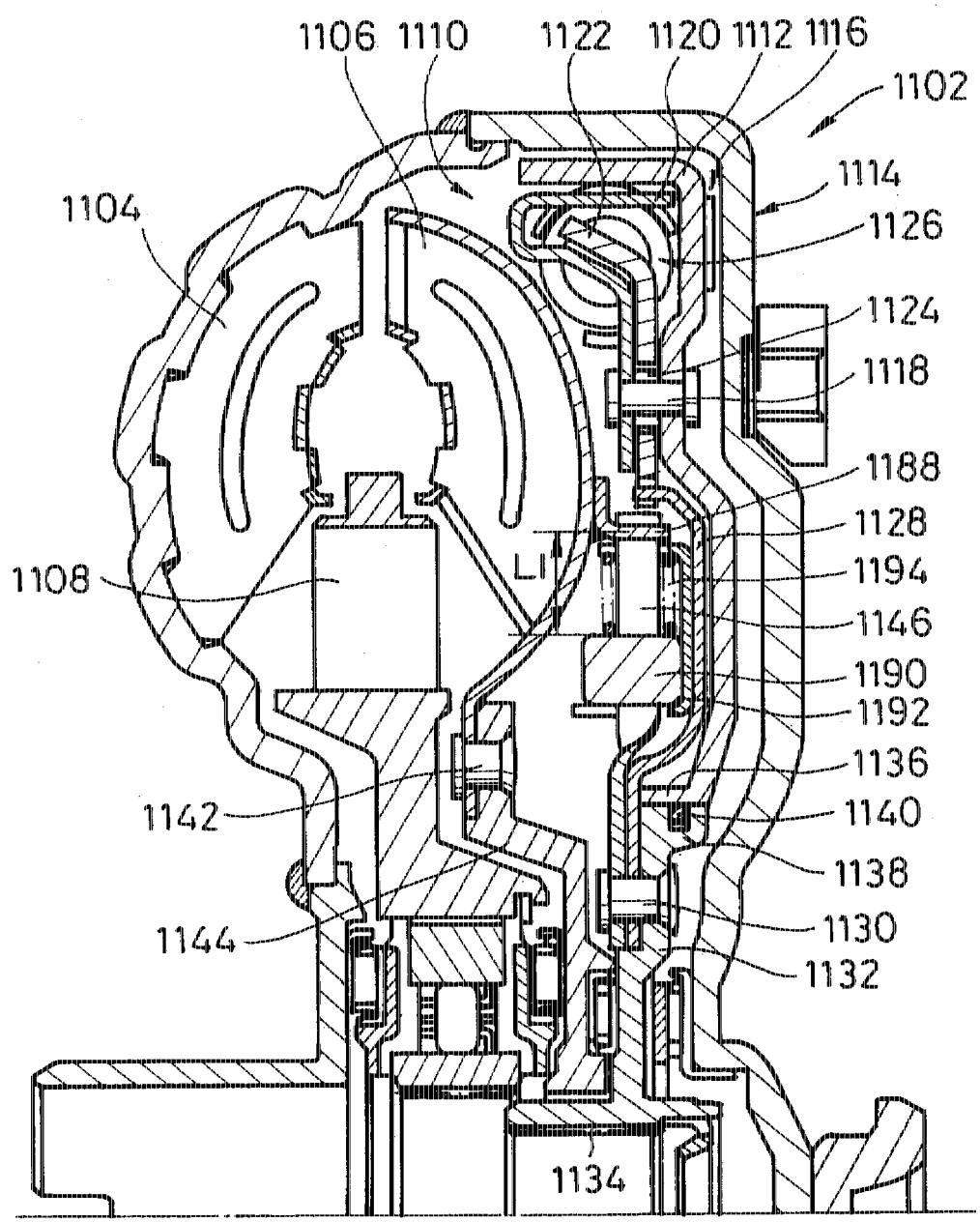
FIG. 30 is a vertical sectional view schematically showing the fluid transmission device according to the fifteenth aspect of performance.

FIG. 30 is a vertical sectional view schematically showing a fluid transmission device according to the fifteenth aspect of performance.

The fifteenth aspect of performance consists in that the inner damper spring 846 being the elastic body in the twelfth aspect of performance is replaced with a leaf spring 1146, the elastic force of which is rendered variable.

Referring to FIG. 30, the leaf spring 1146 has its hub (inner diameter side) integrally fixed to the driven plate 1128 and the turbine hub 1132 by a rivet 1130. The leaf spring 1146 is twisted 90° halfway, and the upper part thereof is adapted to flex in the peripheral direction thereof. In addition, a protuberance 1188 is attached to the turbine 1106. The protuberance 1188 lies in touch with both the ends (outer diameter side) of the leaf spring 1146. Thus, the turbine 1106 is resiliently joined to the turbine hub 1132.

Figure 31:
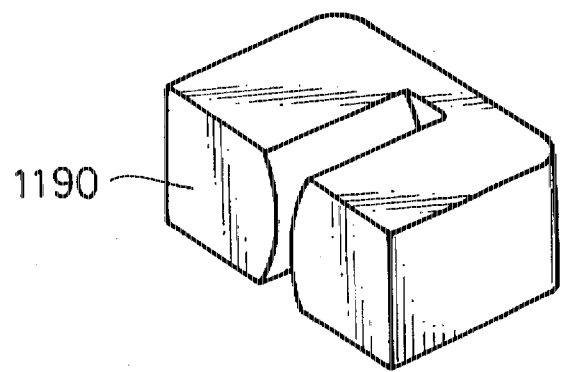
FIG. 31 is a perspective view showing the mass member or piece which constitutes elastic-force variation means in the fifteenth aspect of performance.
Figure 32:
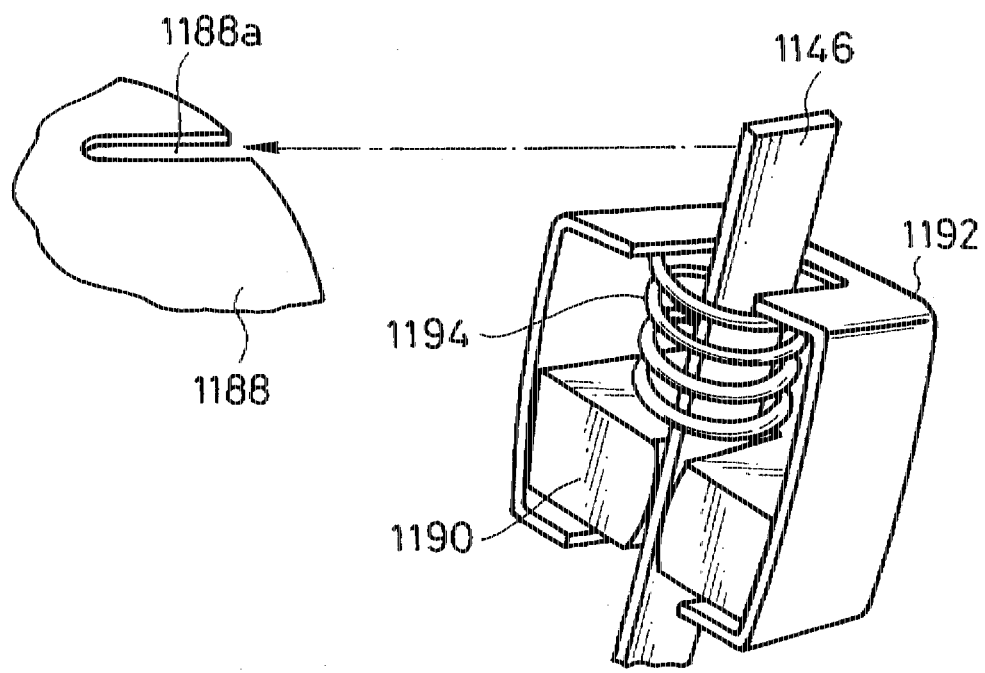
FIG. 32 is a perspective view showing the construction of the elastic-force variation means in the fifteenth aspect of performance.

A mass element 1190 which is centrally formed with a recess as shown in FIG. 31, is mounted on the leaf spring 1146 so as to receive this leaf spring 1146 in the recess. A method for the mounting is illustrated in FIG. 32. A part of the mass element 1190 is covered with a retaining cover 1192. In this state, the mass element 1190 is urged toward the inner diameter side of the leaf spring 1146 by a coiled spring 1194. Besides, the upper part of the leaf spring 1146 protrudes above the retaining cover 1192, and the upper end thereof enters the notch 1188a of the protuberance 1188 so as to touch this protuberance 1188. The retaining cover 1192 is fixed to the driven plate 1128 by welding (or clinching). Further, the mass element 1190 is movable in the radial direction of the fluid transmission device.

By the way, since the remaining construction is basically the same as in the first or twelfth aspect of performance stated before, it shall be omitted from description on the condition that numerals each having the same two lower digits are assigned to the identical or similar members in FIG. 30.

The fifteenth aspect of performance operates as described below.

The turbine 1106 is resiliently joined to the turbine hub 1132 through the leaf spring 1146 so as to be rotatable relatively thereto in a minute amount.

When, in the operating state of the direct coupling clutch 1110, the driven plate 1128 is rotated in the same manner as in the first or twelfth aspect of performance, the leaf spring 1146 integrated with the driven plate 1128 by the rivet 1130 is rotated.

In a case where the frequency of the rotation of the leaf spring 1146 is low, the mass element 1190 is pressed toward the inner diameter side by the coiled spring 1194. On this occasion, the part L1 of the leaf spring 1146 lying above the mass element 1190 as indicated in FIG. 30 is long, and it acts as the effective length of the leaf spring 1146, so that the spring constant of the leaf spring 1146 becomes small. Accordingly, the resonance frequency of the leaf spring 1146 becomes low.

Figure 33:
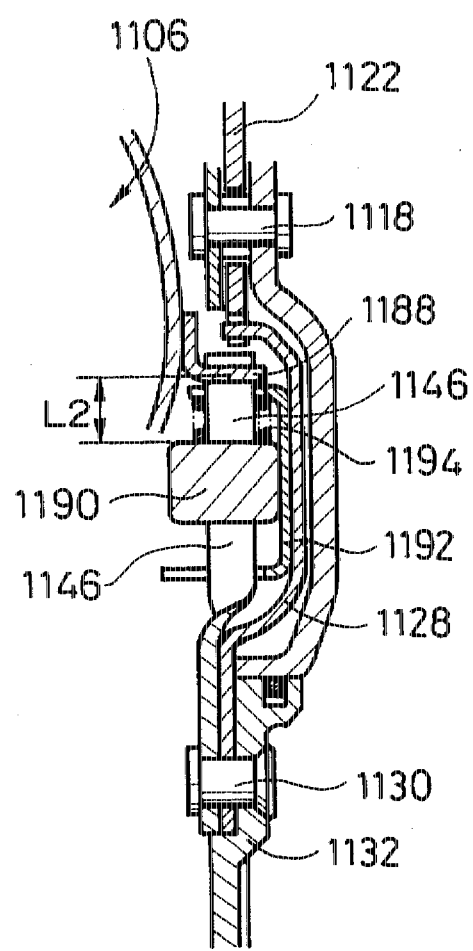
FIG. 33 is a vertical sectional view showing the function of the mass member in the fifteenth aspect of performance.

On the other hand, when the rotational frequency heightens, the mass element 1190 is moved toward the outer diameter side by a centrifugal force as shown in FIG. 33. In consequence, the part L2 of the leaf spring 1146 lying above the mass element 1190 shortens. Thus, the effective length of the leaf spring 1146 becomes small, and the spring constant thereof becomes large. Accordingly, the resonance frequency becomes high.

In this manner, according to the fifteenth aspect of performance, the spring constant of the dynamic damper is varied in accordance with the r.p.m. of the engine, whereby the resonance point of the damper is set at a low frequency side for the low revolutions of the engine and at a high frequency side for the high revolutions. Therefore, the reduction of the oscillations based on the added dynamic damper can be achieved in a wide frequency region.

Moreover, in the fifteenth aspect of performance, the elastic-force variation means is constituted by the leaf spring 1146 and the mass element 1190 mounted thereon, instead of the inner damper spring 846. It is therefore possible to make the size of the whole device smaller.

Incidentally, in the fifteenth aspect of performance, the centrifugal force is utilized for moving the mass element 1190 in order to vary the spring constant of the leaf spring 1146. However, this expedient is not restrictive, but various other expedients based on the pressure of oil, the electromagnetic force of a solenoid, etc. are possible.

It is also to be understood that the oscillation suppression means may well be any means for varying the mass (inertial force) of the damper weight or inertial member, apart from the friction damping means, the viscous damping means, and the means for varying the elastic force of the elastic body as mentioned in the twelfth~fifteenth aspects of performance.

In this manner, according to each of the twelfth~fifteenth aspects of performance, the oscillations which develop in the new frequency region due to adding the new dynamic damper function can also be suppressed without enlarging the size of the device construction.

As set forth above, they are examples of aspects of performance according to the present invention. Thus, according to the present invention, a member, which constitutes a fluid transmission device and which does not contribute to torque transmission under the operating state of a direct coupling clutch, is resiliently supported on a member contributive to the torque transmission, through an elastic body. Therefore, the originally existing member can be employed as the mass body or piece of a dynamic damper, whereby a new dynamic damper function can be afforded without increasing the weight of the fluid transmission device or a space for accommodating the device. Besides, the drivable region of a motor vehicle in the direct-connection state of the direct coupling clutch can be expanded toward the lower vehicle speed range of the motor vehicle, whereby the fuel consumption of the motor vehicle can be enhanced without degrading the oscillation characteristics of the fluid transmission device.

Now, a further aspect of the present invention will be described. It is similar to the feature disclosed above in the feature that the dynamical balance of damper function of a direct coupling clutch is altered between in the lockup-ON state and lockup-OFF state of the direct coupling clutch by utilizing a member (an originally existing member) in the fluid transmission device.

However, a practicable way for the alteration is different from that above, as will be detailed below.

As is well known, lockup-ON is the state in which input elements and output elements are mechanically held in direct connection without the intervention of fluid. Therefore, the power transmission efficiency of a fluid transmission device is heightened. On the other hand, however, the fluctuations of a torque, or an engine revolution speed (r.p.m.), etc. attributed to the explosion of an engine might be transmitted to the driving wheels of a motor vehicle, resulting in degradation in the riding quality of the motor vehicle.

Figure 40:
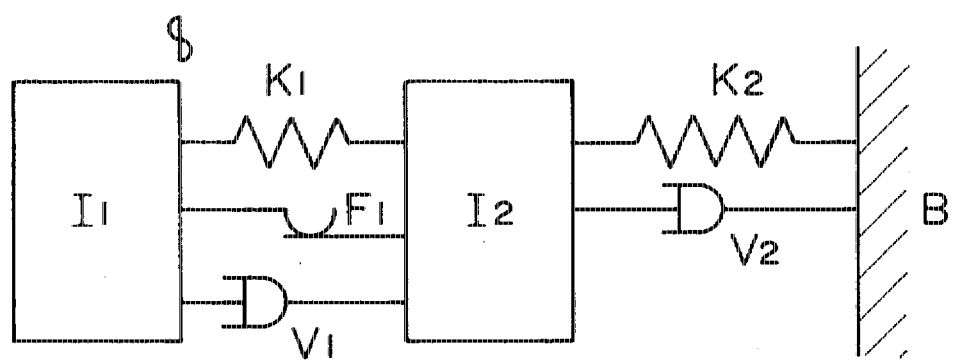
FIG. 40 is a schematic diagram of a simplified model showing an oscillation transmission system in the prior art.

As an example of a measure for countering the drawback, a torque converter furnished with a damper mechanism which reduces oscillations by means of an elastic body or damper mass (inertial mass member) is disclosed in the official gazette of Japanese Patent Application Laid-open No. 251661/1988. As already mentioned above, in this prior-art technique, the lockup clutch (direct coupling clutch) of the torque converter is separately provided with a weight piece or member of great mass as the damper mass. Thus, the moment of inertia of the output elements (that is, the moment of inertia I2 of the secondary side of the automatic transmission as indicated in FIG. 40) is increased to suppress the torque fluctuation and the r.p.m. fluctuation of the engine at the time of the lockup-ON.

In the prior-art torque converter, the weight piece functions as part of the secondary-side moment of inertia I2 and reduces the oscillations. In other words, the mass of the output elements including a turbine etc. is increased (by this separately added weight piece), whereby the secondary-side moment of inertia I2 is increased to reduce the oscillations.

However, in such a case where the oscillations are reduced by increasing the moment of inertia I2 of the secondary side, the construction of the prior-art technique has the problem that the mass of the weight piece being the additional mass needs to be increased more in compliance with the request for the reduction of the oscillations, so the torque converter itself becomes heavier in weight or larger in size.

In view of this problem, the sixteenth aspect of performance of the present invention, which corresponds to claim 16, adopts the following construction: A stator which is merely running idle at the time of the lockup-ON is connected with output elements (members on the secondary side), whereby the mass of the stator is caused to function as an additional mass forming the moment of inertia I2 of the secondary side. Thus, the reduction of the oscillations at the time of the lockup-ON is achieved while the increase of the weight of the torque converter and the enlargement of the size thereof attributed to the additional mass are suppressed.

The practicable aspects of performance of the present invention described above will now be described with reference to FIG. 34~FIG. 39.

FIG. 31 is a sectional view showing a fluid transmission device according to the sixteenth aspect of performance of the present invention. The shell 1902 of a pump 1901 is united with a front cover 1903 by welding, and a torque converter housing 1904 is formed by the shell 1902 and the front cover 1903. A turbine (body) 1905 is arranged in opposition to the pump 1901, and it is fixed to a turbine hub 1909 by a rivet 1910, together with a plate 1907 on the driven side (secondary side) of a damper mechanism (function) 1906. The damper mechanism 1906 damps a torque which is transmitted from a lockup clutch (direct coupling clutch) 1911 to the turbine hub 1909 through the driven side plate 1907.

The lockup clutch 1911 is configured of a piston member (lockup piston) 1912 which is arranged extending along the inside surface of the front cover 1903 and which is mounted on the turbine hub 1909 so as to slide in its axial direction, and a friction member 1913 which is attached to the outer peripheral surface of the piston member 1912 opposing to the inside surface of the front cover 1903. Further, a plate 1914 on the driving side of the damper mechanism 1906 is held in engagement with the piston member 1912 so as to rotate unitarily. Interposed between the driving side plate 1914 and the driven side plate 1907 is a (damper) spring 1915 which damps in the circumferential directions of both these plates.

By the way, in this aspect of performance, the "input elements" (the primary side) of the fluid transmission device are the pump 1901 and the members which rotate unitarily therewith. Concretely, the input elements correspond to the pump 1901, the shell 1902, the front cover 1903, etc. On the other hand, the "output elements" (the secondary side) of the fluid transmission device are the turbine 1905 and the members which rotate unitarily therewith. Concretely, the output elements correspond to the turbine 1905, the turbine hub 1909, the piston member 1912 of the lockup clutch 1911, etc.

Figure 36A:
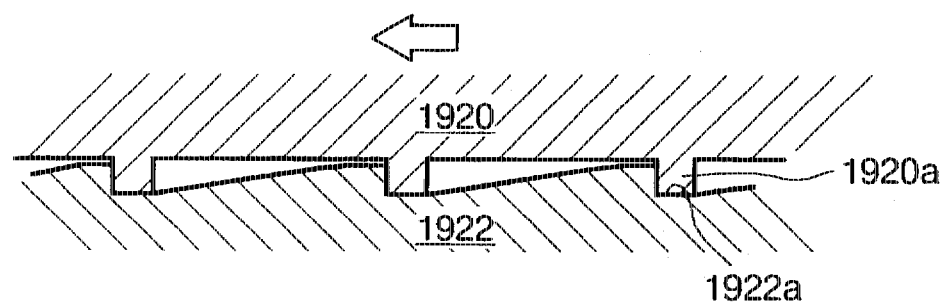
FIGS. 36A and 36B are enlarged sectional views showing the operating states of the one-way clutch of a stator which is included in the fluid transmission device according to the sixteenth aspect of performance, respectively.
Figure 36B:
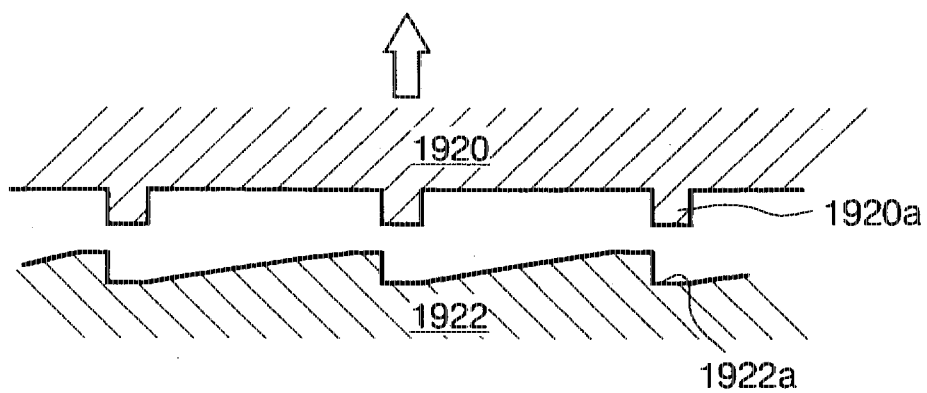

A stator 1916 is interposed between the inflow part of the pump 1901 on the inner-peripheral side thereof and the outflow part of the turbine 1905 on the inner-peripheral side thereof. The stator 1916 is configured of a stator body 1919 which includes a blade 1917, and a one-way cam front 1920 which is fixed in fit engagement with the inner-peripheral side of the stator body 1919. Besides, a stator hub 1921 is fixed to a stationary shaft (not shown) arranged centrally of the stator 1916, and a one-way cam rear 1922 is fixed to the outer periphery of the stator hub 1921. Here, a one-way clutch 1923 falls into its engaged or applied state when the one-way cam front 920 and the one-way cam rear 1922 are brought into engagement with each other. FIGS. 36A and 36B are sectional views of the engaging portions of both the elements 1920 and 1922 as developed in the circumferential directions thereof.

As seen from FIG. 36A, the one-way clutch 1923 has a structure in which the rotation of the one-way cam front 1920 of the stator side in the direction of a bold arrow indicated in the figure, is restrained by the mesh engagement between protuberances 1920a formed in the one-way cam front 1920 and slant-surface steps 1922a formed in the one-way cam rear 1922.

Figure 34:
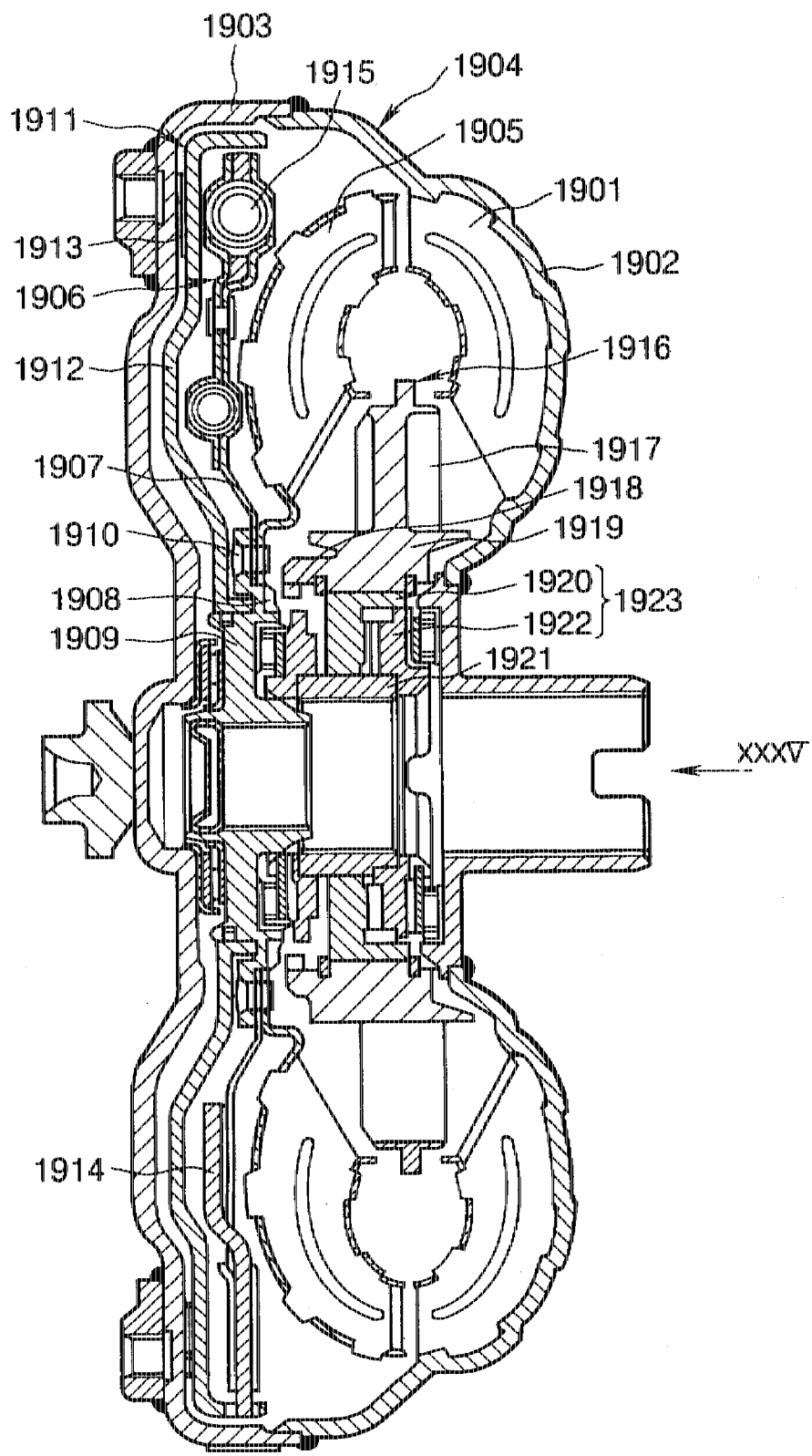
FIG. 34 is a vertical sectional view showing the fluid transmission device according to the sixteenth aspect of performance.
Figure 35:
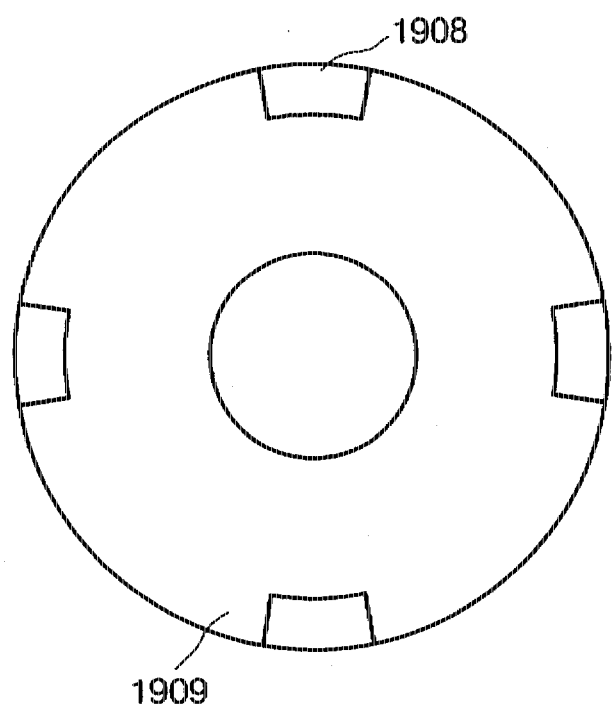
FIG. 35 is a view of a turbine hub as seen in a direction XXXV indicated in FIG. 34.

Here in the sixteenth aspect of performance, stator connection means includes a plurality of fitting recesses 1908 (refer to FIG. 35 showing the turbine hub 1909 viewed in a direction XXXV indicated in FIG. 34) which are formed in the turbine hub 1909 so as to lie at predetermined intervals in the circumferential direction thereof, and projections 1918 which are formed in the stator body 1919 so as to have a radius equal to that of the fitting recesses 1908 (that is, so as to lie in parallel with the fitting recesses 1908 when viewed in the axial direction of the fluid transmission device).

Incidentally, the lockup clutch 1911 is connected to an unshown hydraulic circuit, and the piston member 1912 is moved in the axial direction by an oil pressure, whereby the friction member 1913 is engaged with or disengaged or released from the front cover 1903 to change-over the states of transmission of the torque. More specifically, when the friction member 1913 is engaged with the front cover 1903, the state of lockup-ON is established in which power is mechanically transmitted. In contrast, when the friction member 1913 is disengaged from the front cover 1903, the state of lockup-OFF is established in which the power is transmitted from the pump 1901 to the turbine 1905 through oil.

Next, the operation of the above torque converter will be explained.

Usually, in the lockup-OFF state in which the power is transmitted through the oil, the pump 1901 unitary with the front cover 1903 is rotated, and the oil compulsorily fed by the force of the rotation collides against the turbine 1905 and rotates this turbine 1905. After the oil has collided against the turbine 1905, the oil flows into the stator 1916 and is adjusted its flowing direction by the blade 1917. Thereafter, the oil is supplied into the pump 1901 again so as to amplify the torque of the rotation thereof. Such an operating region is the so-called "converter range".

On this occasion, the stator 1916 is urged toward the pump 1901 (rightwards as viewed in FIG. 34) by the oil. Therefore, the one-way cam front 1920 abuts against the one-way cam rear 1922 until the protuberances 1920a come into engagement with the slant-surface steps 1922a as depicted in FIG. 36A. Thus, the stator 1916 falls into the state in which it is supported so as to be rotatable in only one direction.

Figure 37A:
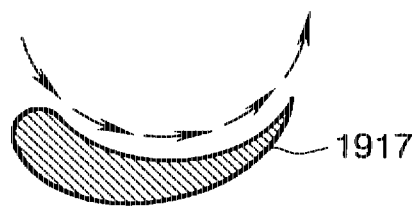
FIGS. 37A and 37B are views showing those streams of a fluid which flow into the blade of the stator in the converter range and in the coupling range of the fluid transmission device depicted in FIG. 34, respectively.
Figure 37B:
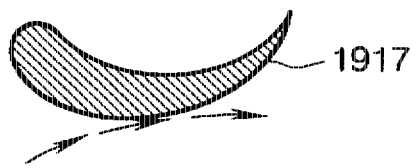

FIGS. 37A and 37B illustrate the flowing directions of the oil which flows to the blade 1917 of the stator 1916. The flowing directions of the oil change depending upon the operating states of the torque converter, as explained below.

In the converter range, the oil collides against the blade 1917 along this blade as shown in FIG. 37A, so that the blade 1917 receives a force toward the pump 1901 (rightwards as viewed in FIG. 34). However, when the rotational speeds of the pump 1901 and the turbine 1905 have gradually equalized, the oil flowing out of the turbine 1905 comes to collide against the blade 917 at the back thereof as shown in FIG. 37B. Thus, the blade 1917 receives a force toward the turbine 1905 (leftwards as viewed in FIG. 34) unlike the force in the converter range. Consequently, the engagement between the protuberances 1920a of the one-way cam front 1920 and the slant-surface steps 1922a of the one-way cam rear 1922 is released as illustrated in FIG. 36B, and the stator 1916 runs idle. Such an operating region is the so-called "coupling range".

In the lockup-ON state in which the friction member 1913 and the front cover 1903 are in engagement, the force of the rotation of the front cover 1903 is transmitted to the piston member 1912 and the damper mechanism 1906 through the friction member 1913, thereby to rotate the turbine hub 1909. Since, on this occasion, the pump 1901 and the turbine 1905 are unitarily rotated, the rotational speeds of both the constituents 1901 and 1905 are naturally equal, and the coupling range stated above is established. Accordingly, the blade 1917 is urged toward the turbine 1905 as explained before.

Thus, the engagement between the protuberances 1920a of the one-way cam front 1920 and the slant-surface steps 1922a of the one-way cam rear 1922 is released as explained before, and the stator 1916 is moved toward the turbine 1905. According to the movement of the stator 1916 toward the turbine 1905, the projections 1918 of the stator 1916 is engaged with the fitting recesses 1908 of the turbine hub 1909, and the stator 1916 is rotated unitarily with the turbine 1905.

Namely, the stator 1916 which functions in the lockup-OFF state to supply the oil flowed out of the turbine 1905 toward the pump 1901, and to amplify the torque of the rotation of the pump 1901, is automatically connected with the turbine hub 1909 and is rotated unitarily with this turbine hub in the lockup-ON state. In this way, the moment of inertia I2 of the secondary side of the automatic transmission is increased to the magnitude (I2+Ia). Thus, the mass of the originally existing stator 1916 is effectively used as the mass for forming the moment of inertia I2, in the lockup-ON state, whereby the increase of the weight and the enlargement of the size of the torque converter attributed to the additional mass can be suppressed.

Figure 38:
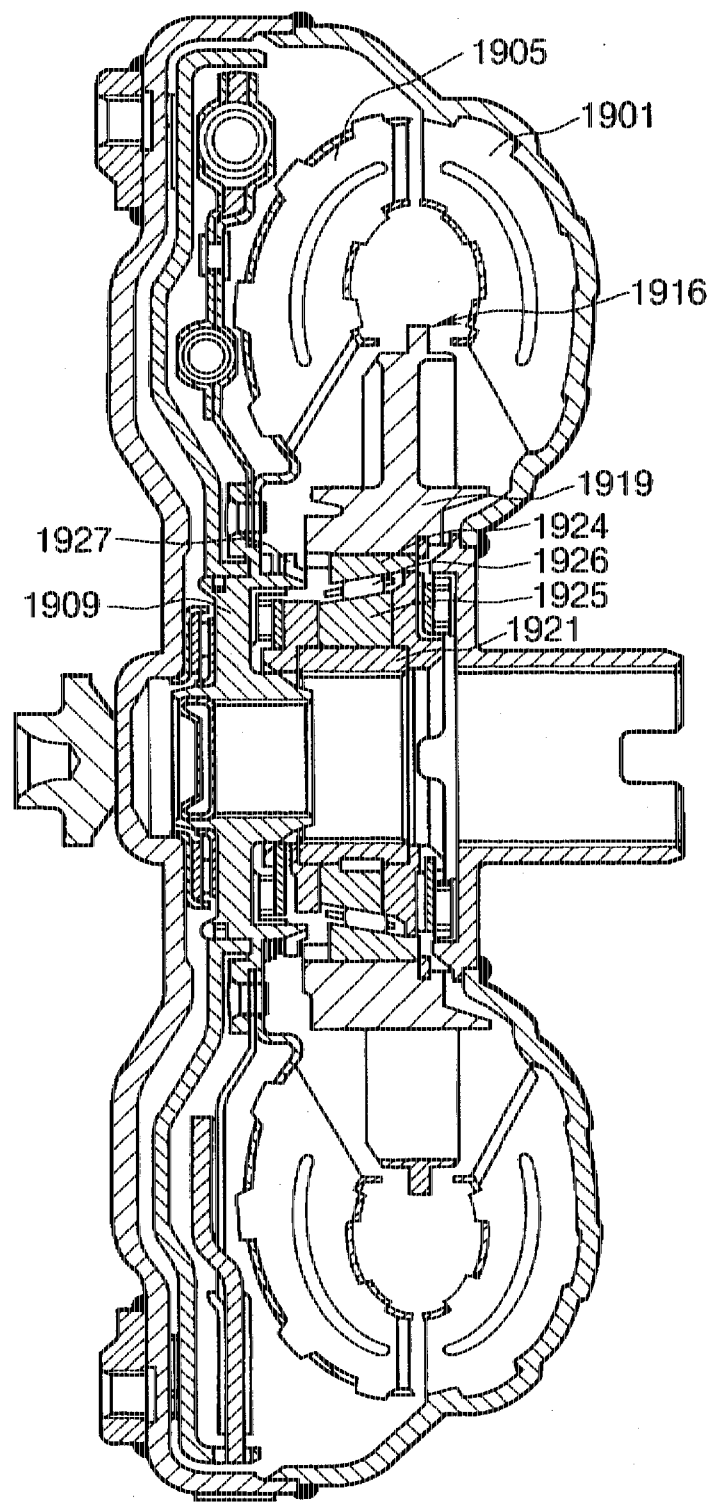
FIG. 38 is a vertical sectional view showing the fluid transmission device according to the seventeenth aspect of performance.

Now, FIG. 38 illustrates a fluid transmission device according to the seventeenth aspect of performance. This seventeenth aspect of performance differs from the sixteenth aspect of performance in the state of the stator connection means and the structure for supporting the stator, and is the same as the sixteenth aspect of performance in the constructions of the other principal components. Therefore, the identical reference numerals shall be assigned to the same constituents, and the common constructions shall be omitted from detailed description.

First, in the seventeenth aspect of performance, an outer race 1924 and an inner race 1925 are respectively disposed in fixed states on the inner-peripheral side of a stator body 1919 and on the outer-peripheral side of a stator hub 1921. Besides, a plurality of rollers 1926 each having a torsional angle and a tangential angle as predetermined are interposed between the races 1924 and 1925 so as to lie in the circumferential directions thereof. Thus, the outer race 1924, inner race 1925 and rollers 1926 construct a one-way clutch which allows the stator 1916 to rotate in one direction and restrains it from rotating in the opposite direction.

Further, in the seventeenth aspect of performance, a synchronizer ring 1927 is rotatably mounted on a turbine hub 1909 as the stator connection means. When the stator 1916 has been moved to the side of a turbine 1905 by the fluid force or hydraulic power of oil arising at the time of the lockup-ON of the fluid transmission device as explained before, the stator 1916 abuts against the synchronizer ring 1927. On this occasion, the force of rotation of the turbine hub 1909 is transmitted to the stator 1916 through the synchronizer ring 1927, and the stator 1916 is rotated unitarily with the turbine 1905 in synchronism with the rotation of the turbine hub 1909.

Owing to the above construction, also in the seventeenth aspect of performance, the connection of the stator 1916 with the turbine hub 1909 becomes possible, and the mass of the stator 1916 can be effectively used as the additional mass of the secondary side in the lockup-ON state. Moreover, in this aspect of performance, the synchronizer ring 1927 absorbs the difference between the rotational speeds of the turbine hub 1909 and the stator 1916 and synchronizes the rotations of both the constituents 1909 and 1916, so that both these constituents can be smoothly connected and disconnected.

Figure 39:
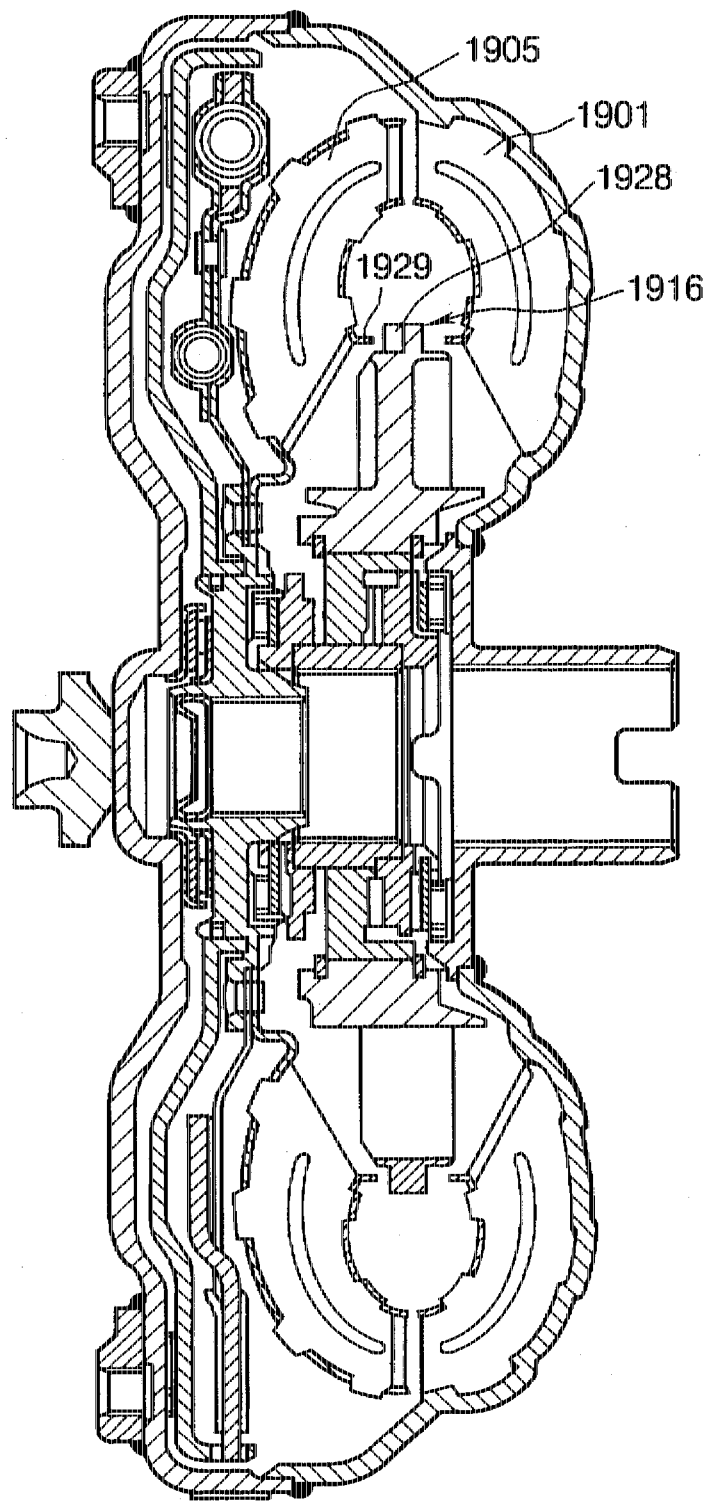
FIG. 39 is a vertical sectional view showing the fluid transmission device according to the eighteenth aspect of performance.

FIG. 39 illustrates a fluid transmission device according to the eighteenth aspect of performance. This eighteenth aspect of performance differs from the sixteenth aspect of performance in the feature of the stator connection means, and is the same as the sixteenth aspect of performance in the structure for supporting the stator and the constructions of the other principal components. Therefore, the identical reference numerals shall be assigned to the same constituents, and the common constructions shall be omitted from detailed description.

In the eighteenth aspect of performance, the stator connection means includes a plurality of fitting recesses 1928 which are formed in the outer-peripheral part of the stator 1916 so as to lie at predetermined intervals in the circumferential direction thereof, and a plurality of projections 1929 which are formed in the core part of a turbine 1905 so as to lie in the circumferential direction thereof and to have a radius of gyration equal to that of the fitting recesses 1928. Thus, when the stator 1916 has been moved to the side of the turbine 1905 by the fluid force of oil arising at the time of the lockup-ON of the fluid transmission device, the stator 1916 and the turbine 1905 come into mutual engagement through the abutment between the fitting recesses 1928 and the projections 1929, whereby the stator 1916 is rotated unitarily with the turbine 1905. In this way, also in the eighteenth aspect of performance, the stator 1916 is connected with the turbine 1905 and is rotated unitarily therewith, so that the mass of the stator 1916 can be effectively used as the mass of the secondary side in the lockup-ON state. Moreover, in this eighteenth aspect of performance, the connection (or engagement) of the stator 1916 is effected at the core part of the turbine 1905 exhibiting a low rigidity, unlike those in the sixteenth and seventeenth aspects of performance, so that a shock at the time of the connection is moderated to permit smooth connection and disconnection (or disengagement).

Originally, the stator 1916 ought to amplify the torque of the rotation of a pump 1901 in such a way that, in the case of the transmission of the power through the fluid (in the lockup-OFF state of the fluid transmission device), the oil which flows out of the turbine 1905 is caused to flow to the pump 1901 in the forward direction of the rotation thereof. However, although the stator 1916 heightens the efficiency of the torque transmission in the lockup-OFF state, it has heretofore been a member which merely intervenes in the fluid and runs idle so as not to form a resistance, in the lockup-ON state.

Each of the sixteenth thru eighteenth aspects of performance according to the present invention defined by claim 16 consists in that the fluid force acting on the stator 1916 in the coupling range of the torque converter is utilized as an urging force for moving the stator 1916 toward the turbine 1905, whereby the stator 1916 which does not fulfill the original function in the lockup-ON state is caused to function as the member for increasing the moment of inertia I2 of the secondary side to the magnitude (I2+Ia).

Each of the foregoing sixteenth thru eighteenth aspects of performance has the construction in which the stator 1916 is moved toward the turbine 1905 by the fluid force of the oil. It is also allowed, however, to adopt a construction in which an actuator for driving the stator 1916 is separately mounted and has its operating state controlled, thereby to control the connection and disconnection of the stator 1916 with and from the output element. It is also possible to move the output element toward the stator 1916 and to connect the former with the latter.

Besides, each of the sixteenth thru eighteenth aspects of performance features that the stator 1916 disposed for amplifying the torque of the rotation of the pump 1901 in the lockup-OFF state is connected in the lockup-ON state with the turbine 1905 or the member rotating unitarily with this turbine 1905, in other words, the secondary-side member, so as to function as the damper mass of the secondary-side member. Even with any connection parts (or portions) other than the connection parts explained in each aspect of performance, accordingly, the basic functional effect of the present invention defined by claim 16 can be produced as long as the stator 1916 is connected in the lockup-ON state with the member rotating unitarily with the turbine 1905 and functions as part (Ia) of the moment of inertia of the secondary side. For example, in the sixteenth thru eighteenth aspects of performance, the stator 1916 may well be connected with either turbine hub 1909 or turbine body 1905 to achieve the same function.

By the way, in each aspect of performance of the present invention defined by claim 16, the mass of the stator 1916 is utilized as that of the secondary side in the lockup-ON state. It is also allowed, however, that a mass member or piece is separately disposed in compliance with a request for the reduction of oscillations within the limits within which the torque converter does not become larger in size, whereby the stator 1916 and the separate mass member are caused to conjointly function as the additional mass of the secondary side.

As set forth above, according to a fluid transmission device conforming to the present invention defined by claim 16, a stator which is arranged in order to amplify the torque of an input element in the lockup-OFF state of the device is connected in the lockup-ON state of the device with a turbine or an output element rotating unitarily with the turbine, so as to function as the mass of the output element. Thus, oscillations ascribable to the fluctuation of the torque can be effectively reduced while the fluid transmission device is restrained from increasing in weight and enlarging in size on account of any additional mass member.

What is claimed is:

1. A fluid transmission device which includes a pump, turbine, and a direct coupling clutch having a damper means, adapted to directly connect the pump and the turbine; further comprising:

a mass member which forms a part of a torque transmission path from the pump under a disengaged state of said direct coupling clutch, and does not contribute to torque transmission under an engaged state of said direct coupling clutch is mounted so as to act as a damper weight which affects a dynamic balance of said damper means during engagement of said direct coupling clutch.

2. A fluid transmission device as defined in claim 1, wherein said mass member which does not contribute to the torque transmission is resiliently supported on a member contributive to said torque transmission, through an elastic body, so that said mass member is utilized as said damper weight which affects the dynamic balance of said damper means.

3. A fluid transmission device as defined in claim 2, wherein the body of said turbine is selected as said mass member which does not contribute to said torque transmission, and a turbine hub joined with an output side of said direct coupling clutch is selected as said member contributive to said torque transmission.

4. A fluid transmission device as defined in claim 2, further comprising a stopper mechanism which prevents said elastic body from flexing in excess of a predetermined magnitude when said direct coupling clutch is in a disengaged state.

5. A fluid transmission device as defined in claim 4, wherein said member which is resiliently supported by said elastic body includes a lug, and said stopper mechanism comprises said lug.

6. A fluid transmission device as defined in claim 2, further comprising restraint means for completely restraining an elastic function of said elastic body when said direct coupling clutch is in a disengaged state.

7. A fluid transmission device as defined in claim 2, wherein said elastic body is assembled in a previously-pressed state.

8. A fluid transmission device as defined in claim 2, wherein said elastic body is arranged extending in a direction of a tangential line at a point of contact between said elastic body and the first-mentioned member which does not contribute to the torque transmission under the engaged state of said direct coupling clutch, the tangential line being tangential to a circle which passes through the point of contact and which is concentric with a axial line of said first-mentioned member.

9. A fluid transmission device as defined in claim 2, wherein said elastic body is retained by a retaining cover, and an interconnection portion for associating said elastic body with said member which does not contribute to the torque transmission under the engaged state of said direct coupling clutch, is formed penetrating through said retaining cover for said elastic body.

10. A fluid transmission device as defined in claim 9, wherein said retaining cover for said elastic body includes two plates between which said elastic body is sandwiched, and each of said plates includes a cylindrical portion for containing said elastic body therein, as well as a general shape portion other than said cylindrical portion, said general shape portion being in a stepped shape so as to form a space when said plates are joined to each other.

11. A fluid transmission device as defined in claim 2, further comprising oscillation suppression means capable of suppressing oscillations which are generated anew in a specified frequency region by the resilient support based on said elastic body, under the engaged state of said direct coupling clutch.

12. A fluid transmission device as defined in claim 11, wherein said oscillation suppression means is friction damping means.

13. A fluid transmission device as defined in claim 11, wherein said oscillation suppression means is viscous damping means.

14. A fluid transmission device as defined in claim 11, wherein said oscillation suppression means is elastic-force variation means capable of varying an elastic force of said elastic body.

15. A fluid transmission device as defined in claim 14, wherein said elastic body is a leaf spring, and said elastic-force variation means is made of an inertial member which is mounted on one end side of said leaf spring in a manner to be shiftable relatively to the other end side of said leaf spring through utilization of a centrifugal force, so as to vary an effective length of said leaf spring.

16. A fluid transmission device as defined in claim 1, wherein said mass member which does not contribute to the torque transmission is a member which is not originally rotary under the engaged state of said direct coupling clutch, and said member which is not originally rotary is coupled with a rotary member located downstream of said damper means and is rotated therewith during the engagement of said direct coupling clutch, so that said member which is not originally rotary it is utilized as said damper weight which affects the dynamic balance of said damper means.

17. A fluid transmission device as defined in claim 16, wherein said fluid transmission device is a torque converter which includes a stator, said stator is selected as said member which is not originally rotary under said engaged state of said direct coupling clutch, and said turbine is selected as said rotary member located downstream of said damper means.

18. A fluid transmission device as defined in claim 17, wherein said stator is supported in a manner to be axially movable, and it is moved toward said turbine till the connection therewith by a fluid force which develops in said torque converter under said engaged state of said direct coupling clutch.

* * * * *